US007653695B2

(12) United States Patent
Flury et al.

(10) Patent No.: US 7,653,695 B2
(45) Date of Patent: Jan. 26, 2010

(54) COLLECTING, AGGREGATING, AND MANAGING INFORMATION RELATING TO ELECTRONIC MESSAGES

(75) Inventors: Andrew Flury, San Bruno, CA (US);
Scott Banister, Half Moon Bay, CA (US); Craig Sprosts, San Francisco, CA (US); Patrick R. Peterson, San Francisco, CA (US); Michael V. Olivier, Belmont, CA (US)

(73) Assignee: Ironport Systems, Inc., San Bruno, CA (US)

( * ) Notice: Subject to any disclaimer, the term of this patent is extended or adjusted under 35 U.S.C. 154(b) by 795 days.

(21) Appl. No.: 11/062,320

(22) Filed: Feb. 17, 2005

(65) Prior Publication Data

US 2005/0193076 A1  Sep. 1, 2005

Related U.S. Application Data

(60) Provisional application No. 60/545,609, filed on Feb. 17, 2004, provisional application No. 60/574,530, filed on May 25, 2004.

(51) Int. Cl.
G06F 15/16 (2006.01)
(52) U.S. Cl. ...................................... 709/206
(58) Field of Classification Search .................. 709/206
See application file for complete search history.

(56) References Cited

U.S. PATENT DOCUMENTS 5,319,776 A   6/1994   Hile et al.
5,623,600 A   4/1997   Ji et al.
5,646,982 A   7/1997   Hogan et al.
5,802,178 A   9/1998   Holden et al.

(Continued)

FOREIGN PATENT DOCUMENTS

EP    1509014 A2    2/2005

(Continued)

OTHER PUBLICATIONS

Garreston, "IronPort looks to be E-mail's Guardian", Network World, Sep. 2004, 2 pages.

(Continued)

*Primary Examiner*—Salad Abdullahi
*Assistant Examiner*—Imad Hussain
(74) *Attorney, Agent, or Firm*—Hickman Palermo Truong & Becker LLP

(57) ABSTRACT

A method and apparatus for managing information relating to electronic messages is provided. A first set of data related to one or more message senders is obtained from a first source, such as an email sever or email gateway. Each message sender has sent one or more electronic messages. A second set of data related to the one or more message senders is obtained from a second source. Message volume information that describes the messages sent by the one or more message senders for a period of time is determined based on the first set of data and the second set of data. The message volume information may be used to determine whether a particular message sent by a particular message sender is unsolicited. If a particular message is determined to be unsolicited, various actions may be performed on messages sent by the sender of the particular message.

57 Claims, 15 Drawing Sheets

U.S. PATENT DOCUMENTS

| | | | |
|---|---|---|---|
| 5,805,810 A | 9/1998 | Maxwell |
| 5,832,208 A | 11/1998 | Chen et al. |
| 5,889,943 A | 3/1999 | Ji et al. |
| 5,915,087 A | 6/1999 | Hammond et al. |
| 5,937,162 A | 8/1999 | Funk et al. |
| 5,958,005 A | 9/1999 | Thorne et al. |
| 5,968,176 A | 10/1999 | Nesset et al. |
| 5,983,270 A | 11/1999 | Abraham et al. |
| 5,983,350 A | 11/1999 | Minear et al. |
| 5,999,967 A | 12/1999 | Sundsted |
| 6,003,084 A | 12/1999 | Green et al. |
| 6,006,329 A | 12/1999 | Chi |
| 6,052,709 A | 4/2000 | Paul |
| 6,072,942 A | 6/2000 | Stockwell et al. |
| 6,131,110 A | 10/2000 | Bates et al. |
| 6,151,491 A | 11/2000 | Farris et al. |
| 6,161,130 A | 12/2000 | Horvitz et al. |
| 6,192,114 B1 | 2/2001 | Council |
| 6,195,587 B1 | 2/2001 | Hruska et al. |
| 6,212,558 B1 | 4/2001 | Antur et al. |
| 6,226,670 B1 | 5/2001 | Ueno et al. |
| 6,233,618 B1 | 5/2001 | Shannon |
| 6,266,664 B1 | 7/2001 | Russell-Falla et al. |
| 6,266,692 B1 | 7/2001 | Greenstein |
| 6,282,565 B1 | 8/2001 | Shaw et al. |
| 6,289,105 B1 | 9/2001 | Murota |
| 6,330,590 B1 | 12/2001 | Cotton |
| 6,341,309 B1 | 1/2002 | Vaid et al. |
| 6,393,568 B1 | 5/2002 | Ranger et al. |
| 6,408,336 B1 | 6/2002 | Schneider et al. |
| 6,421,709 B1 | 7/2002 | McCormick et al. |
| 6,434,600 B2 | 8/2002 | Waite et al. |
| 6,453,327 B1 | 9/2002 | Nielson |
| 6,460,050 B1 * | 10/2002 | Pace et al. ............. 707/104.1 |
| 6,484,261 B1 | 11/2002 | Wiegel |
| 6,502,131 B1 | 12/2002 | Vaid et al. |
| 6,507,866 B1 | 1/2003 | Barchi |
| 6,539,430 B1 | 3/2003 | Humes |
| 6,546,416 B1 | 4/2003 | Kirsch |
| 6,587,550 B2 | 7/2003 | Council et al. |
| 6,591,291 B1 | 7/2003 | Gabber et al. |
| 6,609,196 B1 | 8/2003 | Dickinson, III et al. |
| 6,650,890 B1 | 11/2003 | Irlam et al. |
| 6,654,787 B1 | 11/2003 | Aronson et al. |
| 6,675,162 B1 | 1/2004 | Russell-Falla et al. |
| 6,701,440 B1 | 3/2004 | Kim et al. |
| 6,708,205 B2 | 3/2004 | Sheldon et al. |
| 6,732,153 B1 * | 5/2004 | Jakobson et al. ............. 709/206 |
| 6,732,157 B1 | 5/2004 | Gordon et al. |
| 6,748,422 B2 | 6/2004 | Morin et al. |
| 6,785,732 B1 | 8/2004 | Bates et al. |
| 6,842,772 B1 | 1/2005 | Delaney et al. |
| 6,854,007 B1 | 2/2005 | Hammond |
| 6,886,099 B1 | 4/2005 | Smithson et al. |
| 6,894,981 B1 | 5/2005 | Coile et al. |
| 6,941,304 B2 | 9/2005 | Gainey et al. |
| 6,941,348 B2 | 9/2005 | Petry et al. |
| 6,981,023 B1 | 12/2005 | Hamilton et al. |
| 7,149,778 B1 | 12/2006 | Patel et al. |
| 7,171,450 B2 | 1/2007 | Wallace et al. |
| 7,177,909 B2 | 2/2007 | Stark et al. |
| 7,181,498 B2 | 2/2007 | Zhu et al. |
| 7,206,814 B2 | 4/2007 | Kirsch |
| 7,219,148 B2 * | 5/2007 | Rounthwaite et al. ....... 709/224 |
| 7,246,121 B2 | 7/2007 | Adar et al. |
| 7,363,569 B2 | 4/2008 | Pendakur et al. |
| 7,366,761 B2 | 4/2008 | Murray et al. |
| 7,366,919 B1 * | 4/2008 | Sobel et al. .................... 726/23 |
| 7,428,580 B2 | 9/2008 | Hullfish et al. |
| 7,523,168 B2 | 4/2009 | Chadwick et al. |
| 2001/0005885 A1 | 6/2001 | Elgamal et al. |
| 2001/0032137 A1 | 10/2001 | Bennett et al. |
| 2002/0016824 A1 | 2/2002 | Leeds |
| 2002/0023135 A1 | 2/2002 | Shuster |
| 2002/0059385 A1 | 5/2002 | Lin |
| 2002/0059418 A1 * | 5/2002 | Bird et al. ................... 709/224 |
| 2002/0116463 A1 | 8/2002 | Hart |
| 2002/0120600 A1 | 8/2002 | Schiavone et al. |
| 2002/0120705 A1 * | 8/2002 | Schiavone et al. .......... 709/207 |
| 2002/0133469 A1 | 9/2002 | Patton |
| 2002/0144154 A1 | 10/2002 | Tomkow |
| 2002/0160757 A1 | 10/2002 | Shavit et al. |
| 2002/0169954 A1 | 11/2002 | Bandini et al. |
| 2002/0184315 A1 | 12/2002 | Earnest |
| 2002/0198950 A1 | 12/2002 | Leeds |
| 2002/0199095 A1 | 12/2002 | Bandini et al. |
| 2003/0023875 A1 | 1/2003 | Hursey et al. |
| 2003/0028580 A1 | 2/2003 | Kucherawy |
| 2003/0050988 A1 * | 3/2003 | Kucherawy ................. 709/207 |
| 2003/0055724 A1 | 3/2003 | Battin et al. |
| 2003/0069933 A1 | 4/2003 | Lim et al. |
| 2003/0069935 A1 | 4/2003 | Hasegawa |
| 2003/0074411 A1 | 4/2003 | Nale |
| 2003/0079142 A1 | 4/2003 | Margalit et al. |
| 2003/0088824 A1 | 5/2003 | Ayan |
| 2003/0093689 A1 | 5/2003 | Elzam et al. |
| 2003/0095555 A1 * | 5/2003 | McNamara et al. ......... 370/401 |
| 2003/0096605 A1 * | 5/2003 | Schlieben et al. ........... 455/419 |
| 2003/0097591 A1 | 5/2003 | Pham et al. |
| 2003/0105800 A1 | 6/2003 | Cullen |
| 2003/0109248 A1 * | 6/2003 | Lewis ........................ 455/412 |
| 2003/0110224 A1 | 6/2003 | Cazier et al. |
| 2003/0134621 A1 | 7/2003 | Yabe et al. |
| 2003/0149726 A1 * | 8/2003 | Spear ......................... 709/206 |
| 2003/0158905 A1 * | 8/2003 | Petry et al. .................. 709/206 |
| 2003/0167402 A1 | 9/2003 | Stolfo et al. |
| 2003/0172050 A1 | 9/2003 | Decime et al. |
| 2003/0172291 A1 | 9/2003 | Judge et al. |
| 2003/0191969 A1 * | 10/2003 | Katsikas ..................... 713/201 |
| 2003/0210649 A1 | 11/2003 | Bondi |
| 2003/0212791 A1 | 11/2003 | Pickup |
| 2004/0006747 A1 | 1/2004 | Tyler |
| 2004/0019651 A1 | 1/2004 | Andakar |
| 2004/0054742 A1 | 3/2004 | Gruper et al. |
| 2004/0058673 A1 | 3/2004 | Irlam et al. |
| 2004/0064371 A1 | 4/2004 | Crapo |
| 2004/0068542 A1 | 4/2004 | Lalonde et al. |
| 2004/0073617 A1 | 4/2004 | Miliken et al. |
| 2004/0083230 A1 | 4/2004 | Caughey |
| 2004/0083408 A1 | 4/2004 | Spiegel et al. |
| 2004/0093384 A1 * | 5/2004 | Shipp ......................... 709/206 |
| 2004/0117648 A1 * | 6/2004 | Kissel ......................... 713/200 |
| 2004/0133561 A1 | 7/2004 | Burke |
| 2004/0139165 A1 | 7/2004 | McMillan et al. |
| 2004/0139314 A1 * | 7/2004 | Cook et al. .................. 713/151 |
| 2004/0167964 A1 | 8/2004 | Rounthwaite et al. |
| 2004/0167968 A1 | 8/2004 | Wilson et al. |
| 2004/0177110 A1 * | 9/2004 | Rounthwaite et al. ....... 709/202 |
| 2004/0177120 A1 | 9/2004 | Kirsch |
| 2004/0181581 A1 | 9/2004 | Kosco |
| 2004/0199595 A1 * | 10/2004 | Banister et al. .............. 709/207 |
| 2004/0215977 A1 | 10/2004 | Goodman et al. |
| 2004/0254990 A1 | 12/2004 | Mittal |
| 2004/0260922 A1 | 12/2004 | Goodman et al. |
| 2005/0005107 A1 | 1/2005 | Touboul |
| 2005/0010644 A1 | 1/2005 | Brown et al. |
| 2005/0033812 A1 | 2/2005 | McCarthy et al. |
| 2005/0064850 A1 | 3/2005 | Irlam et al. |
| 2005/0071432 A1 * | 3/2005 | Royston ..................... 709/206 |
| 2005/0071485 A1 | 3/2005 | Ramagopal |
| 2005/0080855 A1 * | 4/2005 | Murray ...................... 709/206 |
| 2005/0080856 A1 | 4/2005 | Kirsch |
| 2005/0080858 A1 * | 4/2005 | Pessach ...................... 709/206 |
| 2005/0091320 A1 * | 4/2005 | Kirsch et al. ................ 709/206 |

| | | | |
|---|---|---|---|
| 2005/0108518 | A1 | 5/2005 | Pandya |
| 2005/0141486 | A1* | 6/2005 | Gilchrist et al. ............. 370/352 |
| 2005/0182959 | A1 | 8/2005 | Petry et al. |
| 2005/0188020 | A1* | 8/2005 | Avritch et al. ............... 709/206 |
| 2005/0193429 | A1 | 9/2005 | Demopoulos et al. |
| 2005/0198155 | A1 | 9/2005 | Zakharoff |
| 2005/0204005 | A1 | 9/2005 | Purcell et al. |
| 2005/0228996 | A1* | 10/2005 | Mayer ........................ 713/170 |
| 2005/0259644 | A1 | 11/2005 | Huitema et al. |
| 2006/0010220 | A1* | 1/2006 | Malik ......................... 709/206 |
| 2006/0031306 | A1 | 2/2006 | Haverkos |
| 2006/0031314 | A1 | 2/2006 | Brahms et al. |
| 2006/0116162 | A1 | 6/2006 | Desai et al. |
| 2007/0130350 | A1* | 6/2007 | Alperovitch et al. ........ 709/229 |
| 2007/0201496 | A1 | 8/2007 | Motoyama |
| 2008/0104186 | A1 | 5/2008 | Wieneke et al. |
| 2008/0104187 | A1 | 5/2008 | Wilson et al. |
| 2008/0209347 | A1 | 8/2008 | Malik et al. |
| 2008/0256072 | A1 | 10/2008 | Logan et al. |
| 2008/0270540 | A1 | 10/2008 | Larsen |
| 2009/0019126 | A1 | 1/2009 | Adkins |

FOREIGN PATENT DOCUMENTS

| | | |
|---|---|---|
| WO | WO 01/67330 A1 | 9/2001 |
| WO | WO/ 02/19069 A2 | 3/2002 |
| WO | WO 02/25464 A1 | 3/2002 |
| WO | WO 02/39356 A1 | 5/2002 |
| WO | WO 02/019069 A | 7/2002 |
| WO | WO 2005/081477 A1 | 9/2005 |

OTHER PUBLICATIONS

Spam Assassin, "SpamAssassin: Tests Performed", Spam Assassin, Jun. 4, 2003, 51 pages.
Achelis, Steven B., "Technical Analysis from A to Z", Introduction-Moving Averages, Equis International, 2001, 12 pages.
Visualware, "VisualRoute Server", Visualware Inc., Mar. 12, 2001, 4 pages.
International Bureau, "International Preliminary Report on Patentability." PCT/US2005/018999, dated Feb. 28, 2007, 5 pages.
Current Claims, PCT/US2005/018999, 14 pages.
Avery, Mike, "Networking: Product Reviews: MimeSweeper neatly cleans up e-mail Web Content," InfoWorld Jun. 23, 1997, reproduced by High Beam Research LLC., 3 pages. (Reference on CD-ROM).
Cashramspam.com, "CashRamSpam.com," file://C:\DOCUME~1\LOCALS~-1\temp\2OJL2VHQ.htm, printed Feb. 19, 2003, 9 pages. (Reference on CD-ROM).
"Check Point Firewalls," [Online], retrieved from the internet URL: <http://www.trellisnet.com/Security/Checkpoint/firewalls.asp>, Trellis Network Services, Retrieved on May 18, 2004, pp. 1-3. (Reference on CD-ROM).
"Check Point Signs Technology licensing Agreement with RSA Data Security," Check Point Software Technologies Ltd., Sep. 18, 1995, 2 pages. (Reference on CD-ROM).
"Check Point Software technologies to Secure Backweb's Internet Broadcasting Software," Check Point Software Technologies Ltd., reproduction of article from Internet World dated Dec. 11, 1996, 2 pages. (Reference on CD-ROM).
"Control Data Systems Partners With Check Point Software To Resell FireWall-1," Check Point Software Technologies Ltd., Feb. 21, 1996, 2 pages. (Reference on CD-ROM).
International Searching Authority, "Notification of Transmittal of the International Search Report and the Written Opinion of the International Searching Authority, or the Declaration," PCT/US04/00969, Aug. 18, 2004, 10 pages. (Reference on CD-ROM).
Current Claims in PCT patent application, International Application No. PCT/US03/37417, 16 pages. (Reference on CD-ROM).
Current Claims in International Application, application No. PCT/US04/00969, 19 pages. (Reference on CD-ROM).
International Searching Authority, "Notification of Transmittal of the International Search Report or the Declaration," PCT/US03/37417, Jun. 8, 2004, 7 pages. (Reference on CD-ROM).
Declude, "List of All Known DNS-based Spam Databases," Apr. 20, 2004, http://www.declude.com/Articles.asp?ID=97, data retrieved Jun. 27, 2005, pp. 1-21. (Reference on CD-ROM).
Dwork, Cynthia, et al., "Pricing via Processing or Combatting Junk Mail," Draft of full version, preliminary version of this paper was presented at Crypto '92, pp. 1-11. (Reference on CD-ROM).
eSOFT.COM, "InstaGate EX2-the Firewall with a Future," eSoft Incorporated, 2001, 9 pages. (Reference on CD-ROM).
"eTrust Secure Content Manager," Computer Associates International Inc., 2003, pp. 1-7. (Reference on CD-ROM).
"Fighting Fire with Fire," Computer Reseller News, n757, pp. 143-152, Oct. 6, 1997, 14 pages. (Reference on CD-ROM).
"F-Secure Internet Gatekeeper," F-Secure Data Sheet, F-Secure Corporation, 2 pages. (Reference on CD-ROM).
Google Groups, "MIME mail bombs," Message 1 thread from Selden E. Ball Jr., dated Feb. 28, 1995, 3 pages. (Reference on CD-ROM).
Google Groups, "PMDF and VSWEEP Virus Scanner," Message 1 thread from Eileen Byrne Telecom 617-386-2181, dated Nov. 13, 1995, 2 pages. (Reference on CD-ROM).
Google Groups, "Virus Scanning", Message 1 Thread from John F. Reddington dated Jul. 25, 1995, 5 pages. (Reference on CD-ROM).
Google Groups, "Virus Scanning", Sara.Appleyard, Sep. 8, 1996, 5 pages. (Reference on CD-ROM).
"Integralis Announces MIMEsweeper Compatible with Check Point FireWall-1 on Single NT Server," Checkpoint Software Technologies Ltd., Sep. 16, 1996, 2 pages. (Reference on CD-ROM).
Kent, Stephen T., "Internet Privacy Enhanced Email," Communications of the ACM, vol. 36, No. 8, Aug. 1993, pp. 48-60. (Reference on CD-ROM).
Lemos, Robert, "Paying Up for a Spam Seal of Approval," Jun. 24, 2002, http://news.com.com/2100-1001-938976.html, printed Feb. 19, 2003, pp. 1-3. (Reference on CD-ROM).
Mason, Justin, "SpamAssasin Prehistory: filter.plx," [Online], [retrieved on Jun. 20, 2005]. Retrieved from the internet:http://spamassasin.apache.org/prehistory/. (Reference on CD-ROM).
McCullagh, Declan, "Spam Blocker charges for e-mail," CNET Newsc.com, Feb. 19, 2003, Retrieved from <http://www.dotcomeon.com/payformail.htm>, printed Jun. 30, 2005, 2 pages. (Reference on CD-ROM).
MIMEsweeper 2.0 Press Release, "Integralis releases MIMEsweeper Version 2.0 with SMTP mail security support," [online], Jan. 15, 1996, [retrieved on Jun. 8, 2004]Retrieved from the internet: http://web.archive.org/web/19961112103826/www.nha.com/re120.htm (Reference on CD-ROM).
MIMEsweeper 2.3 Press Release, "Integralis announces version 2.3 of MIMEsweeper with new email security features," reproduced from Email World, Jun. 13, 1996, 2 pages. (Reference on CD-ROM).
"MIMEsweeper 'Online' SPD," product description for MIMEsweeper [online], [retrieved on Jun. 8, 2004], retrieved from the Internet: http://web.archive.org/web/1996112103244/www.nha.com/msw_onli.htm (Reference on CD-ROM).
"New Product 'E-Mail Virus Wall' protects companies from e-mail-borne viruses, including new macro viruses," Business Wire, p. 02160157, Feb. 16, 1996, 3 pages. (Reference on CD-ROM).
Nicholas, Nick, "Realtime Blackhole List, Spamware Defined," downloaded on May 27, 2004 from <http://mail-abuse.org/rbl/spamware.htm, 2 pages. (Reference on CD-ROM).
Olawsky, Duane et al., "Developing and Using a 'Policy Neutral' Access Control Policy," Secure Computing Corporation, Dec. 2, 1996, pp. 60-67.
Omniva, "Omniva Policy Manager," Technical White Paper, Ominiva Policy Systems, Jan. 2004, pp. 1-23. (Reference on CD-ROM).
Oppliger, Rolf, "Internet Security; Firewalls and Bey," Communication of the ACM, vol. 40, No. 5, May 1997, pp. 92-102. (Reference on CD-ROM).
Postini Inc., "Postini Perimeter Manager: The Industry's Leading Email Security and Management Solution," Postini Inc., 2004, 4 pages. (Reference on CD-ROM).
"Prevention of Forged-Spam email via Sendmail (Relay Disable)" <http://docsrv.sco.com/MM_admin/mmadminC.spam_forge.html>, Nov. 1999. (Reference on CD-ROM).
"Product Overview- IronMail: The Secure Email Gateway Appliance," CipherTrust, 2 pages. (Reference on CD-ROM).

Prolin, P. et al., "Network Security Probe", Telecom Bretagne, Nov. 1994, pp. 229-240. (Reference on CD-ROM).

"Raptor Systems and Trend Micro to Develop Integrated Firewall/Virus Wall; Security Partnership to Protect Against Unauthorized Access and Viruses," Business Wire, p. 05030072, May 3, 1996, 2 pages. (Reference on CD-ROM).

Rhyolite Software, "Distributed Checksum Clearinghouse," [Online] [Retrieved on Jun. 20, 2005], retrieved from the internet: http://www.rhyolite.com/anti-spam/dcc, pp. 1-5, (Reference on CD-ROM).

Sullivan, Andy "Buffalo Spammer' Sentenced to 3-½ to 7 years", U.S. National-Reuters downloaded on May 27, 2004 from <http://news.yahoo.com/news?tmpl=story&u=/nm/20040527/us_nm/tech_spam_dc>, 2 pages_ (Reference on CD-ROM).

"Surf Control E-mail Filter," http://www.surfcontrol.com/uploadedfiles/SEF_datasheet.pdf, SurfControl plc., 4 pages. (Reference on CD-ROM).

"Symantic Ships Norton AntiVirus for Internet Email Gateways," PR Newswire, p. 0224SFM068, Feb. 24, 1997, 4 pages. (Reference on CD-ROM).

"The Elm Filter System Guide," CETS Answers, Computing and Educational Technology Services, University of Pennsylvania, Jun. 24, 2003, 8 pages. (Reference on CD-ROM).

"The Elm Filter System Guide, What the Filter Program is, and How to Use It," San Diego State University Rohan Academic Computing, May 29, 1996, pp. 1-8, available online at http://www-rohan.sdsu.edu/filter.html.

Thorud, G., "Message Handling Systems," Telektronikk, vol. 90, No. 2, 1994, pp. 86-88. (Reference on CD-ROM).

Trend Micro, "Policy-based Antivirus and Content Security for the Messaging Gateway," White Paper, Trend Micro Interscan Messaging Security Suite, Jun. 2002, pp. 1-20. (Reference on CD-ROM).

Trumbo, Jan et al., "Features: Big, Bad E-mail," Network Computing, Oct. 8, 1996, 4 pages, available at <http://www.nwc.com/716/716f2.html>.

Weisband, Suzanne P. et al., "Managing User Perceptions of Email Privacy," Communications of the ACM, vol. 38, No. 12, Dec. 1995, pp. 40-47. (Reference on CD-ROM).

1997 Press Release, "Trend Micro Sues Integralis for Gateway Anti-VirusPatent Infringement, Seeks to End Sales of E-mail, Internet Gateway Product," Trend Micro, Jul. 8, 1997, 2 pages. (Reference on CD-ROM).

International Searching Authority, "Notification of Transmittal of the International Search Report and the Written Opinion of the International Searching Authority, or the Declaration," PCT/US05/19143, Dated Apr. 7, 2006, 8 pages.

Current Claims, PCT/US05/19143, 24 pages.

International Searching Authority, "Notification of transmittal of the international search report and the written opinion of the international searching authority, or the declaration," international application No. PCT/US2005/005498, dated May 18, 2005, 12 pages.

Current Claims, PCT/US2005/005498, 14 pages.

International Searching Authority, "Notification of Transmittal of the International Search Report and the Written Opinion of the International Searching Authority, or the Declaration," PCT/US05/19037, 10 pages.

Current Claims, PCT/US05/19037, 12 pages.

European Patent Office, "Communication pursuant to Article 96 (2) EPC", European application No. 05 723 433.8-1244, received Aug. 22, 2007, 5 pages.

Claims, European application No. 05 723 433.8-1244, 13 pages.

Patent Cooperation Treaty, "Notification Concerning Transmittal of International Preliminary Report on Patentability," PCT/US2005/005498, received Sep. 12, 2006, 6 pages.

A. Caldwell, "International Search Report," published by International Bureau of WIPO for PCT/US06/17780, Geneva, Switzerland, Jun. 19, 2008, 5 pages.

A. Caldwell, "Written Opinion of International Searching Authority," published by International Bureau of WIPO for PCT/US06/17780, Geneva, Switzerland, Jun. 19, 2008, 7 pages.

J. Levine, "DNS Based Blacklists and Whitelists for E-Mail," draft-irtf-asrg-dnsbl-00.txt, published by The Internet Society, United States, Apr. 26, 2004, 7 pages.

Christenson, Nick, "Sendmail Performance Tuning", Pearson Education, Inc., 2003, 56 pages.

Costales, Brian, et al., "Sendmail, $3^{rd}$ Edition", O'Reilly and Associates, ISBN: 1-56592-839-3, 2003, 61 pages.

Nick Christenson, "sendmail Performance Tuning", Pearson Education, Inc. (2003).

Bryan Costales, with Eric Allman, "sendmail, $3^{rd}$ Edition", O'Reilly & Associates (2003) ISBN: 1-56592-839-3, p. 2-3, 10-11, 15-17 105, 265-70, 298-299, 440-45, 450-51, 458-59, 464-71, 478-9, 1022, 1064-69.

International Searching Authority, "Notification of Transmittal of the International Search Report and the Written Opinion of the International Searching Authority, or the Declaration," dated Jan. 8, 2007, PCT/US05/19038, 6 pgs.

PCT/US05/19038—current claims, 24 pgs.

Klensin, J., "Simple mail Transfer Protocol," Network Working Group, RFC 2821, dated Apr. 2001, 79 pages.

International Searching Authority, "Notification of Transmittal of the International Search Report and the Written Opinion of the International Searching Authority, or the Declaration," PCT/US05/18999, Feb. 6, 2007, 8 pages.

Current Claims, PCT/US05/18999, 14 pages.

* cited by examiner

FIG. 6

COLLECTING, AGGREGATING, AND MANAGING INFORMATION RELATING TO ELECTRONIC MESSAGES

RELATED APPLICATIONS AND CLAIM OF PRIORITY

This application claims priority to U.S. Provisional Application Ser. No. 60/545,609, entitled "COLLECTING, AGGREGATING AND MANAGING INFORMATION RELATING TO ELECTRONIC MESSAGES," citing Andrew Flury, Scott Banister, Craig Sprosts, and Michael Olivier as inventors, filed Feb. 17, 2004, which is incorporated by reference in its entirety for all purposes as if fully set forth herein.

This application also claims priority to U.S. Provisional Application Ser. No. 60/574,530, entitled "COLLECTING, AGGREGATING AND MANAGING INFORMATION RELATING TO ELECTRONIC MESSAGES," citing Andrew Flury, Scott Banister, Craig Sprosts, Patrick R. Peterson, and Michael Olivier as inventors, filed May 25, 2004, which is incorporated by reference in its entirety for all purposes as if fully set forth herein.

This application is related to U.S. patent application Ser. No. 10/717,441 filed Nov. 18, 2003, entitled "ELECTRONIC MESSAGE DELIVERY WITH ESTIMATION APPROACHES," naming Scott R. Banister, Patrick R. Peterson, and James Moore as inventors, which is incorporated by reference in its entirety for all purposes as if fully set forth herein.

This application is related to U.S. patent application Ser. No. 10/857,641 filed May 28, 2004, entitled "TECHNIQUES FOR DETERMINING THE REPUTATION OF A MESSAGE SENDER," naming Robert Brahms and Daniel Quinlan as inventors, which is incorporated by reference in its entirety for all purposes as if fully set forth herein.

This application is related to U.S. patent application Ser. No. 10/856,693 filed May 28, 2004, entitled "ELECTRONIC MESSAGE DELIVERY WITH ESTIMATION APPROACHES," naming Robert Brahms and Daniel Quinlan as inventors, which is incorporated by reference in its entirety for all purposes as if fully set forth herein.

COMPUTER PROGRAM LISTING

This application includes a computer program listing appendix, submitted as an ASCII text file, which is incorporated by reference in its entirety for all purposes as if fully set forth herein. The ASCII text file contains 30,389 bytes, is named AppendixD.txt and is dated Nov. 20, 2009. The contents of the ASCII text file were originally submitted in the filing of the application on Feb. 17, 2005.

FIELD OF THE INVENTION

The present invention generally relates to electronic message delivery in a networked system. The invention relates more specifically to techniques for collecting, aggregating, and managing information relating to electronic messages.

BACKGROUND OF THE INVENTION

The approaches described in this section may be pursued, but are not necessarily approaches that have been previously conceived or pursued. Therefore, unless otherwise indicated herein, the approaches described in this section are not prior art to the claims in this application and are not admitted to be prior art by inclusion in this section.

The use of electronic message communication systems has increased significantly in the recent past. However, numerous users of such systems, whether they are message senders or receivers, find such systems inconvenient and cumbersome to use. Similar problems are associated with telephone, facsimile, and e-mail communications, and others.

In the e-mail context, in one past approach, senders marketing commercial products or services would acquire or develop lists of e-mail addresses and then periodically send mass unsolicited e-mail messages, often of a commercial nature, (hereinafter "spam") to all addresses in the lists. Using modem electronic systems, the cost of sending millions of such messages has been negligible, and a response rate of even less than one percent has been considered worthwhile. Thus, successful delivery of unsolicited messages to valid in-boxes of recipients normally translates into income for the sender.

Unfortunately, this approach causes receivers to receive unwanted messages. The perceived direct and indirect costs of receiving "spam" are high. In response, receivers have adopted a variety of approaches to prevent receipt or viewing of unwanted messages.

In one approach, receivers use filtering or blocking technologies that search for keywords in the message subject line and reject or quarantine messages that contain keywords matching a list of prohibited words. In another approach, receivers use "blacklists" to identify and prohibit display of messages from suspect senders of unsolicited messages. Some receivers augment these technologies with personal "white lists" of friends or other acceptable senders; only messages from senders in the white list are admitted. The white lists and blacklists also may come from networked sources. Techniques for performing blacklist lookups are described at the document "ip4r.htm" that is available online at the time of this writing at directory "/junkmail/support/" of the "declude.com" domain of the World Wide Web.

For legitimate senders, one problem is that legitimate messages do not reach intended receivers because they are blocked by spam filtering or blocking technologies. Meanwhile, receivers who use filtering or blocking technologies regularly fail to receive legitimate messages because the filtering and blocking technologies cannot properly distinguish legitimate messages from unwanted messages. Certain industry-standard terms or technical abbreviations may be identical to prohibited keywords, confusing the "spam" filter.

Further, receivers continue to receive large volumes of unwanted messages that are not properly trapped by the "spam" filter. As a result, many receivers now refuse to disclose their address except under limited circumstances. In response, many legitimate senders, such as reputable commercial enterprises, have developed "opt-in" procedures in which the addresses of receivers, such as customers, are not used at all unless the receiver affirmatively agrees to receive messages. Even when this is done, the filtering or blocking technologies may delete or quarantine even those messages from legitimate senders that are directed to receivers who have "opted in."

Consequently, the value of e-mail as a legitimate marketing tool for communications directed to receivers who have "opted in" is decreasing. Many receivers remain essentially defenseless to the daily onslaught of "spam" arriving in their e-mail in-boxes. While many states have enacted legislation that imposes civil or criminal penalties for sending "spam," these remedies are time-consuming for receivers to pursue. In addition, while many Internet Service Providers ("ISPs")

actively identify and refuse to communicate or do business with those who send "spam," policing such improper activity emanating from their networks imposes a significant cost to the ISP and is exceeding expensive to do completely.

ISPs also incur costs associated with processing messages directed to recipients who do not hold an account with the ISP. For these recipients, the ISP's mail system typically generates an automatic "bounce" message that states that the recipient is unknown. Indeed, a "double bounce" may occur when a message bears an invalid sender address, and is sent to an invalid recipient. Costs are associated with maintaining the equipment and software that generates the bounce messages and dispatching the bounce messages back into the network to the sender. Thus, there is a need for a system or method that can reduce the number of "bounce" and "double bounce" events experienced by ISPs and derived from unwanted messages.

Thus, the problem of "spam" in the Internet e-mail context is essentially a war of attrition. There are legitimate marketing organizations that send promotional messages by bulk e-mail, and other senders who send valid bulk messages. In general, however, no one benefits from the activities of "spammers," other than the "spammers" themselves. ISPs, business enterprises, and end users all suffer inconvenience, costs, and annoyances.

Further, high-value e-mail messages regularly may be blocked or placed into a "Bulk" mail folder, based on rules that appear, to the end user, as complex, random, changing and secret. This costs e-mail marketers, and causes senders to lose confidence in the benefits of e-mail marketing. Moreover, end users are required to invest time in monitoring, checking, delivering, and negotiating "white lists" and similar mechanisms. Even when ISPs and enterprises use anti-"spam" technologies, large numbers of "spam" messages still arrive in the in-boxes of end users, or are placed erroneously in bulk mail folders.

While the foregoing example problems exist in the context of e-mail, instant messaging, chat-room applications, web-based communities (such as message boards, blogs, etc.), telephone, and facsimile communications suffer from analogous problems.

All of the foregoing problems also exist with respect to bulk senders of legitimate messages. For example, retailers, service providers, and other institutions that have large numbers of customers or subscribers may periodically need to send mass mailings of legitimate messages to these customers or subscribers. Although these messages may be completely appropriate or desired by receiving customers or subscribers, processing the inbound messages can require significant storage and processing power on the part of a receiving mail transfer agent. As a result, network administrators and other managers of mail systems may like to receive up-to-date information about current senders of high-volume messages.

Based on the foregoing there is clearly a need for techniques to overcome the needs that are described herein.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is an illustration of a third GUI page, which depicts an example network owner page for a data processing unit;

DETAILED DESCRIPTION

Figure 1:
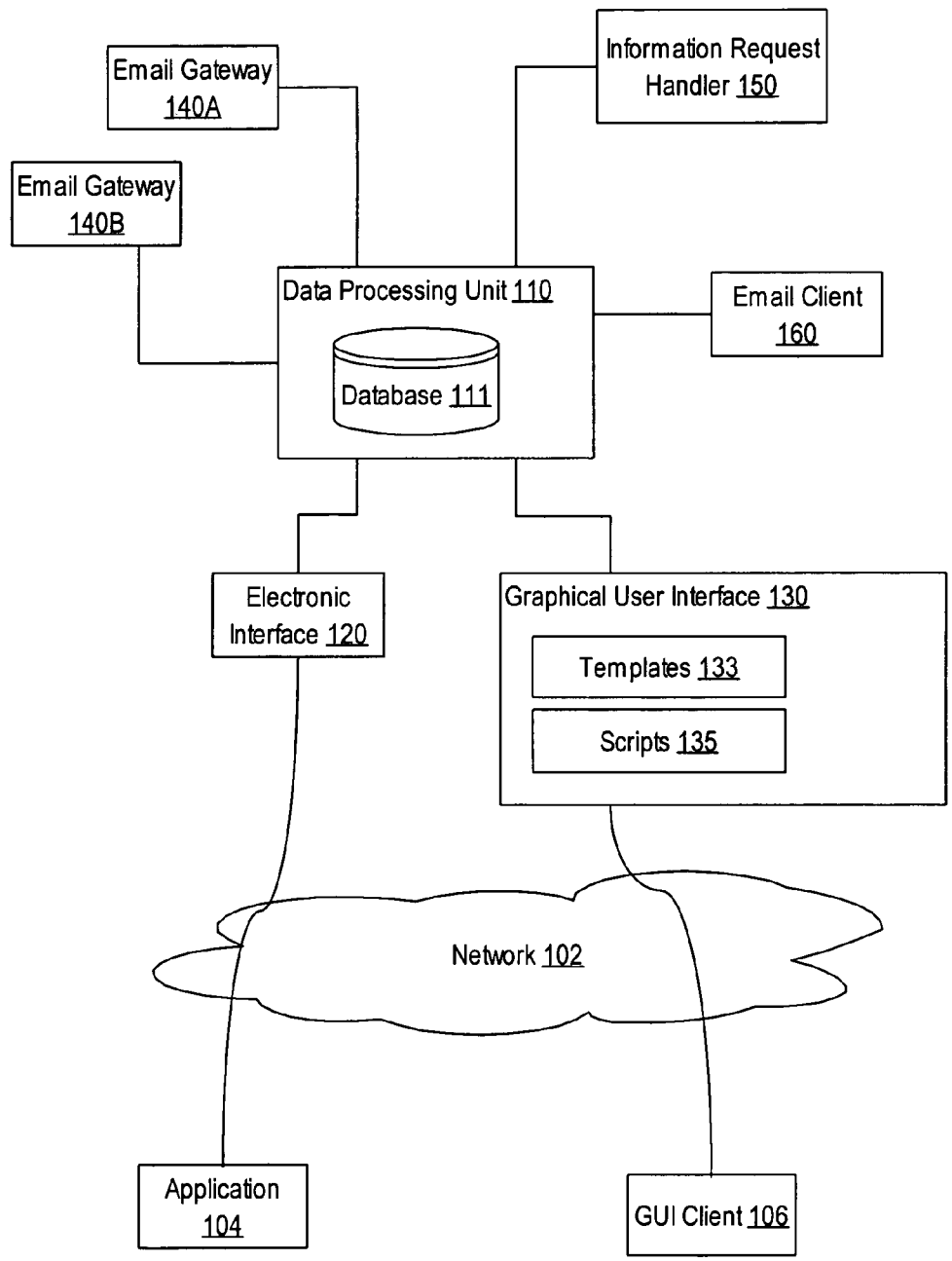
FIG. 1 is a block diagram that illustrates an overview of a system for collecting, aggregating, and managing information relating to electronic messages.

Techniques for collecting, aggregating, and managing information relating to electronic messages are described in this application. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview
3.0 Example Information Related to an Email Sender
4.0 Functional Overview
5.0 Graphical User Interface Examples
6.0 Implementation Mechanisms—Hardware Overview
7.0 Extensions and Alternatives 1.0 General Overview The needs identified in the foregoing Background, and other needs and objects that will become apparent for the following description, are achieved in the present invention, which comprises, in one aspect, techniques for collecting, aggregating, and managing information relating to electronic messages. By managing information relating to electronic messages, reasonable assumptions may be made on how to treat newly received email messages based on the past performance of email senders. Numerous embodiments of the invention make use of the observation that the past behavior of an email sender may be used to determine how to treat a newly received email from the email sender.

In one aspect, the techniques include obtaining, from a first source, a first set of data related to one or more message senders, such as an email server or email gateway. Each message sender has sent one or more electronic messages. A second set of data related to the one or more message senders is obtained from a second source. Message volume information that describes the messages sent by the one or more message senders for a period of time is determined based on the first set of data and the second set of data. The message volume information may be used to determine whether a particular message sent by a particular message sender is unsolicited. If a particular message is determined to be unsolicited, various actions may be performed on messages sent by the sender of the particular message.

In another aspect, the techniques include receiving one or more messages from a particular message sender; sending a request for message volume information related to the particular message sender; receiving the message volume information related to the particular message sender, where the message volume information related to the particular message sender was determined by obtaining a first set of data from a first source and related to one or more message senders each sending one or more electronic messages; obtaining a second set of data from a second source and related to the one or more message senders each sending one or more electronic messages; determining message volume information related to the one or more message senders based on the first set of data and the second set of data; and limiting delivery of messages from the particular message sender based on the message volume information related to the particular message sender.

In another aspect, the techniques include receiving one or more messages from a particular message sender; sending a request for message volume information related to the particular message sender; receiving the message volume information related to the particular message sender, where the message volume information related to the particular message sender was determined by obtaining a first set of data from a first source and related to one or more message senders each sending one or more electronic messages; obtaining a second set of data from a second source and related to the one or more message senders each sending one or more electronic messages; determining message volume information related to the one or more message senders based on the first set of data and the second set of data; and blocking delivery of a particular message from the particular message sender based on the message volume information related to the particular message sender.

In other aspects, the invention encompasses a computer apparatus and a machine-readable medium configured for collecting, aggregating, and managing information relating to electronic messages.

2.0 Structural Overview

FIG. 1 is a block diagram that illustrates an overview of a system for collecting, aggregating, and managing information relating to electronic messages.

A data processing unit 110 is communicatively coupled to one or more information request handlers 150, one or more email gateways 140A and 140B, and one or more email clients 160. In various embodiments, the communicative coupling is accomplished by optical, infrared, or radio signal transmission, direct cabling, wireless networking, local area networks (LANs), wide area network (WANs), wireless local area network (WLAN), or any appropriate communication mechanism or link. The data processing unit includes a database 111. In various embodiments, the database 111 is a relational database, one or more flat files, an object-oriented database, or any appropriate storage mechanism organized according to a schema or other abstract description of data. For example, database 111 may comprise the MySQL system. Example database schemas are described in Appendix C and Appendix D.

The data processing unit 110 provides a graphical user interface 130 and an electronic interface 120. Any other interface may be provided to enable users, applications, or machines to access database 111 and other elements of data processing unit 110. The type of interfaces described in the example herein in no way limit the number of interfaces that may be provided by the data processing unit 110. In various embodiments, the information request handler 150, email gateway 140, and email client 160 are communicatively coupled to the data processing unit 110 using the electronic interface 120 or the graphical user interface 130.

The application 104, GUI client 106, email gateways 140A and 140B, data processing unit 110, information request handler 150, and email client 160 are each logical machines. Each logical machine may run on separate physical computing machines or may be running on the same physical computing machine as one or more of the other logical machines. Various embodiments of computers and other machines are described in detail below in the section entitled Hardware Overview.

The data processing unit 110 may be any appropriate application, machine, or process capable of collecting, storing, and distributing information related to message senders. In various embodiments, the data processing unit 110 is an application or set of applications running on a machine that has one or more graphical user interfaces 130 and one or more electronic interfaces 120. Various embodiments of a machine upon which the data processing unit 110 may execute are described in the section Hardware Overview.

Graphical user interface 130 comprises one or more markup language templates 133 and one or more scripts 135. In various embodiments, the markup language templates are hypertext markup language (HTML) templates, extensible markup language (XML) templates, or any appropriate template. In one embodiment, the templates are used to format the data in the graphical user interface. Alternatively, a GUI 130 may have no markup language templates 133. In such embodiments, the GUI 130 may provide data in any appropriate format in any appropriate manner, including providing the data in a format defined by the programming statements generating the data to be displayed in the GUI 130.

In various embodiments, the scripts 135 are scripts that execute on the machine of an end user, such as an information request handler 150, email client 160, or email gateway 140. In various embodiments, the scripts are machine-executable programs that execute on the data processing unit 110 or a process communicatively coupled thereto. In various embodiments, the scripts process data, format data or perform any appropriate action. Scripts 135 may comprise CGI scripts, Perl scripts, Active Server Page (ASP) code, etc. Scripts 135 also may comprise one or more Java applets, ActiveX controls, etc. Alternatively, markup language templates 133 may include one or more Javascript elements. Scripts 135 and markup language templates 133 cooperate to provide the graphical user interface 130, which may comprise, as an example, the GUI pages shown in FIG. 4-FIG. 13 herein, which are described further below.

In various embodiments, the electronic interface 120 is a web page, a web service, a rsync gateway, a file transfer protocol (FTP) server, a hypertext transfer protocol (HTTP) server, a secure HTTP (HTTPS) server, a defined remote procedure call interface, a transaction control protocol (TCP)/Internet Protocol (EP) sockets interface, a Universal Datagram Protocol (UDP) interface, a domain name server (DNS) interface, or any other appropriate interface. An example of an electronic DNS interface is provided in Appendix B.

Application 104 is communicatively coupled to electronic interface 120 via network 102. GUI client 106 is communicatively coupled to the graphical user interface 130 via network 102. In various embodiments, network 102 comprises optical, infrared, or radio signal transmission, direct cabling, wireless networking, local area networks (LANs), wide area network (WANs), wireless local area network (WLAN), or any appropriate communication mechanism or link.

The application 104 may be any appropriate application, including an email client, an email gateway, an information request handler, or any other process or service capable of communicating with the electronic interface 120 over the network 102. The GUI client 106 may be a browser running on a computer or any other appropriate application running on a machine, which application is capable of communicating with the graphical user interface 130 over the network 102.

In various embodiments, the emails gateways 140A and 140B are each one or more processes running on one or more machines. In various embodiments, the email gateways 140A and 140B process email for one or more email recipients and provide information about email senders to the data processing unit 110. In a related embodiment, the information that the email gateways 140A and 140B provide to data processing unit 110 includes information regarding the reputation of an email sender, whether the email recipient indicated as spam an email sent by the email sender, whether an automated process indicated as spam an email sent by the email sender, or any appropriate information. In various embodiments, the email gateways 140A and 140B obtain information from the data processing unit 110 in order to estimate whether a particular email message is spam. In various embodiments, the email gateway is an Ironport C30 or Ironport C60 device.

The information request handler 150 may be any appropriate machine, user, or process capable of communicating a request over a network. For example, in one embodiment, an information request handler 150 is an email server running on a computer that has a network interface and the email server is capable of replying to a request for information about an email sender. In other embodiments, the information request handler 150 may be any mechanism capable of responding to requests for information about an email sender. An example of an information request handler 150 is the Bonded Sender DNS-based white list lookup service described on the World Wide Web at "bondedsender.org."

In various embodiments, the email client 160 includes one or more processes running on one or more machines. In various embodiments, the email client 160 receives email for one or more email recipients and provides information about email senders to the data processing unit 110. In a related embodiment, the information that the email client 160 provides to data processing unit 110 includes information regarding the reputation of an email sender, whether the email recipient indicated as spam an email sent by the email sender, whether an automated process indicated as spam an email sent by the email sender or any appropriate information. In one embodiment, the email client 160 requests information about a message sender from the data processing unit 110.

An information request handler 150 may collect data about numerous email senders by handling requests about those email senders. In a related embodiment, a data processing unit 110 collects data about one or more message senders from an information request handler 150.

In one embodiment, a request for information about a message sender relates to the sending of email by the message sender. The number of messages sent by the message sender to a particular set of message recipients may be estimated as the number of information requests for information about the message sender. In another related embodiment, the particular set of message recipients is defined as all message recipients associated with one or more information request handlers, message gateways, or other processes that may query for information from the information request handler.

The information may be used for any number of things, including basing a decision to block a message, bounce a message, throttle messages (control the number of messages delivered over time) from a sender or group of senders, displaying the information, or having a human operator make a decision based on the information.

3.0 Example Information Related to an Email Sender

Example information that a data processing unit may collect for message senders are: the time of the first request for information about that email sender, the volume over time of requests for information about that email sender, the percentage of total volume of all requests for information about that email sender, the network owner of the IP address from which the message is sent, the network topology information for the area of the network in which the IP address of the email sender is located, the categories of enterprises or organizations to which the email sender belongs, the time that the IP address of the sender last changed ownership, the geographical location of the email sender, the geographical information about the path the email message has taken, or any other appropriate information.

The time of the first request for information about a particular email sender may be obtained by keeping information related to each request for information for each sender about which information is requested. Whenever information is requested for a sender, a record or set of records related to the request for information may be recorded or modified. In one embodiment, if no information for that sender has been recorded previously, then a new record or set of records is created and the time of the first request is recorded.

In one embodiment, a data processing unit collects the volume over time of requests for information about an email sender or group of senders. The calculation of volume over time may be performed in any appropriate manner and for any appropriate time periods. For example, the volume over time may be calculated as the number of requests for information about a particular sender or group of senders over a day, week, month, 30-day period, or year. In one embodiment, the volume over time is calculated as a percentage:

> Percent volume over time $T$=(number of information requests for a particular sender or group of senders for time $T$)/(total number of information requests for all senders for time $T$)

Alternatively, the volume over time may be calculated as an estimate of total number of messages a particular sender or group of senders has sent on the entire Internet:

> Estimated Total Number of Messages over Time $T$=Estimated Total Number of Messages on Internet over time $T$*Percent volume over time $T$ In another embodiment, the volume over time may be calculated logarithmically to provide a magnitude value or Richter Scale value. RICHTER SCALE is a trademark of IronPort Systems, Inc. for its message volume magnitude value service:

Magnitude value for time $T$=10+log$_{10}$(Percent volume over time $T$)

Another example of a volume over time calculation is the fluctuation in volume over time. In various embodiments, fluctuation in volume over time is a percentage or absolute change in any appropriate volume calculation over time T1 as compared to time T2, where T1<T2; a percentage or absolute change in any appropriate volume calculation over time T1 as compared to time T2, where T1 and T2 do not overlap; a percentage or absolute change in any appropriate volume calculation over time T1 as compared to time T2, where T1<T2 and T2 represents the entire time range for which information about a sender or group of senders has been collected; or any other appropriate calculation.

In one embodiment, a data processing unit determines the network owner associated with a message sender based on the IP address from which the message is sent. In other embodiments, the network owner is determined by geographical location, domain name, or any other appropriate identifier associated with the sender. In one embodiment, the network owner is determined by querying a list or data structure of known network owners of IP addresses. Alternatively, determination of the network owner may be based on domain name, geographical location, or any appropriate information.

In various embodiments, network owners are broken up into one or more groups, herein called network operators. For example, an Internet Service Provider (ISP) may be listed as the network owner for a large block of IP addresses. In such an example, the network operators of portions of the IP addresses owned by the network owner (the ISP) may be used by an email gateway or other server or application to indicate blocking a message, bouncing a message, throttling messages from a sender or group of senders, or displaying the information based on the network owner or network operator.

In various embodiments, the network operators of IP addresses within a set of IP addresses owned by a single network owner are estimated by assigning separate blocks of IP addresses to separate operators, receiving information from the network owner indicating which IP addresses are operated by which network operators, or estimating network operators based on domain names associated with the IP addresses. For example, an ISP is a network owner and owns a block of IP addresses at "152.2.*.*". In such an example, the block of IP addresses may be broken up into blocks of 256 EP addresses: "152.2.1.*", "152.2.2.*", . . . , "152.2.256.*"

The decision whether to break up a network owner may be based on number of IP addresses owned by the network owner or by the category of the ISP. For example, if an ISP owns 1024 IP addresses, it may be useful to divide the 1024 IP addresses into four sets of 256 IP addresses, assigning a network operator to each. In such an example, any blocking, throttling, or other action taken based on network operator will not affect all of the potential message senders with IP addresses owned by the ISP, but will affect only a portion of the senders. As another example, an email-marketing firm that owns 1024 IP addresses may not have its 1024 IP addresses divided into multiple network operators. In such an example, any and all messages may be considered to come from the same company and should be, if appropriate, blocked, throttled, or any appropriate action taken. In various embodiments, assigning a network operator to a set of IP addresses comprises assigning a new network owner corresponding to the network operator for the set of IP addresses.

In one embodiment, the data processing unit 110 obtains network topology information for the area of the network in which the IP address of the email sender is located. In various embodiments, network topology information associated with a particular sender includes network owners of IP addresses near the IP address of the particular sender; network owners of other IP addresses associated with the same geographical area; or any appropriate network topology information. For example, a particular sender has a particular IP address. If that IP address is near one or more other IP addresses that are suspected spam senders, then the IP address may be rated as more likely to produce spam. In one embodiment, an IP address is near another if the two IP addresses have the same high-order significant bits, where the number of bits that are high-order significant bits may be any number of bits, including from 1 bit to 31 bits.

In one embodiment, the data processing unit obtains the category of the enterprise or organization associated with the email sender. In various embodiments, the categories associated with email message senders are airlines, Fortune 500, Fortune 1000, Fortune 1500, ISPs, banks, or any appropriate category. A list of example categories is provided as part of Appendix A.

In one embodiment, the data processing unit records the change of ownership of an IP address. In various embodiments, the change of ownership is recorded by clearing previous information about the IP address or indicating that the owner of the IP address is unknown. Information that may be cleared about the IP address or other indicator may include the first recorded request about a message, volume of requests, or any other appropriate information. In one embodiment, the information request handler keeps track of the number of times that an IP address changes owners. The information about change of ownership combined with other information, such as message volume information, may be used to indicate that a sender may be sending spam.

In one embodiment, the data processing unit records geographical location of the email sender. In one embodiment, the geographical location of the email sender is determined by the IP address, domain name, or a look up table indicating the geographical location of the email sender. Geographical information may be useful in determining which messages are valid. For example, if a particular email recipient never receives email from China, then a message from China may be more likely to be spam.

In one embodiment, the data processing unit obtains geographical information about the path the email message has traveled. In a related embodiment, the geographical path is based on the header information in the email message. The header information in the email message may indicate a path the email message has taken since it was sent. Geographical information may be determined based on the header information in any appropriate manner, including determined by the IP address, domain name, or other look up table indicating the geographical location of gateways the email message has traversed.

The techniques described herein are in no way limited to using the types of information that are described herein. Any appropriate type of information related to the email sender, email messages, or email recipient may be used. For example, information related to email messages may include information in the content of the message, such as the existence of keywords or tokens. An example of email recipient information may be the amount of spam a particular email recipient receives. For example, if 90% of the email that a particular email recipient receives is spam, then that information may be used to aid in the estimation of whether an email directed to that recipient is spam.

4.0 Functional Overview

Figure 2A:
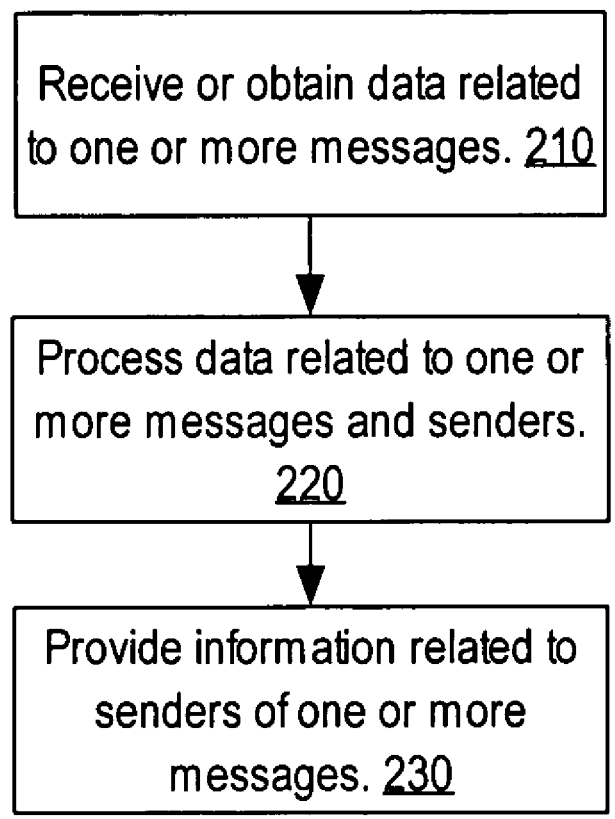
FIG. 2A is a flow diagram depicting a process for collecting, processing, and making available information related to electronic messages.

FIG. 2A is a flow diagram depicting a process for collecting, processing, and making available information related to electronic messages.

In step 210, data related to information about email senders is obtained. Various types of data that may be obtained are described in the section entitled Example Information Related to Email Senders. In various embodiments, data is collected from an email gateway, an information request handler, an email client, or any other appropriate source. In one embodiment, data is obtained by requesting the information from the information source. Alternatively, the information source may provide the information based on any appropriate event or based on any appropriate schedule. The data may also be obtained by performing a DNS zone transfer. Additionally, multiple sets of data for one or more email senders may be obtained from multiple sources or from the same source at two or more different times. For example, in the context of FIG. 1, an information request handler 150 provides new information about email senders once per hour to a data processing unit 110 via an electronic interface 120, such as a DNS-like interface over TCP/IP or UDP. Providers of the information about email senders may be configured to transmit the information to the data processing unit 110 in a variety of ways, such as intermittently, at specified times of the day, or at specified intervals.

In step 220, the data related to information about email senders is processed. In step 220, multiple sets of data related to email senders obtained from multiple sources or obtained from the same source at different times may be taken in aggregate and processed. In various embodiments, processing the data includes determining a volume of messages over time, the percentage of message sent by a message sender compared to all messages sent, a magnitude value, a change of absolute or percentage of total messages of a particular time period as compared to a different time period, a change of absolute or percentage of total messages during a particular time period as compared to absolute or percentage of total messages since the first request for information about the sender was received, or any other appropriate calculation. Various embodiments of the types of data that may be processed are described in the section entitled Example Information Related to an Email Sender. For example, in the context of FIG. 1 the data processing unit 110 calculates a magnitude value for a particular network owner associated with a particular message sender and determines the change in the magnitude value as compared to the magnitude value for the previous day.

In various embodiments, processing information related to a message sender (step 220) includes storing information related to the message sender in a database, flat file, or other storage mechanism. In various embodiments, processing information related to a message sender includes determining the network owner or network operator associated with the message sender. In a related embodiment, the IP address, domain name, geographical location, or network topology of the message sender is used to determine the network owner or network operator associated with the message sender. Various embodiments of network owners and network operators are described in the section entitled Example Information Related to an Email Sender. In related embodiments, the decision whether to associate a network owner or network operator with a message sender is based on whether the IP address or domain name of the message sender is in a set of IP addresses or domain names associated with the network owner or network operator. In a related embodiment, the determination of which network operator to associate with a message sender is made by dividing the set of IP addresses for a network owner associated with a message sender into two or more network operators; and determining which network operator to associate with a message sender based on which network operator is associated with a set of IP addresses containing the IP address of the message sender. In various embodiments, a network owner is divided into network operators based on the category of the network owner, based on the number of IP addresses associated with the network owner, based on information about one or more network operators within the network operator, or any other appropriate decision. For example, in the context of FIG. 1, a message sender is associated with an IP address, which is associated with a particular network owner. The particular network owner is an ISP that owns 1024 IP addresses. The network owner is split into four network operators, each corresponding to 256 IP addresses. The message sender's IP address fall into the range associated with a particular network operator; and the message sender is associated with the particular network operator.

In one embodiment, processing the data related to information about email senders (step 220) includes determining or storing category information for network owners and network operators. Various embodiments of categorizing information are given above in the section entitled Example Information Related to an Email Sender and in Appendix A. Determining the category information for network owners or network operators may include receiving the category information through a GUI, via an electronic interface, or from an email gateway, information request handler, email client, or any appropriate source. Alternatively, the category information may be determined automatically using an automatic categorizer based on keyword detection, Naïve Bayes, or any other appropriate categorization mechanism. In various embodiments, determining the category information includes accessing a list containing category information and cross-referencing it to message senders, network owners, or network operators. In related embodiments, the category information includes a list of airlines, Fortune 500 companies, Fortune 1000 companies, Fortune 1500 companies, ISP, any of the categories listed in Appendix A, or any other appropriate category.

In one embodiment, processing the data related to information about email senders (step 220) includes determining information related to the history of an IP address associated with the message sender. Various embodiments of information related to the history of an IP address are described in the section entitled Example Information Related to an Email Sender. In various embodiments, the information about the history of the of the IP address includes determining when a first request for information was made about the message sender, how many requests have been made about the sender, how many requests over time have been made about the sender, how often the IP address has changed network owners, when the IP address last changed ownership, and any other appropriate information. For example, in the context of FIG. 1, a data processing unit 110 processes data related to an IP address' history in order to determine and store when a request for information about the email sender was first made.

In one embodiment, processing the data related to information about email senders (step 220) includes determining geographical information. Various embodiments of geographical information are described in the section entitled Example Information Related to an Email Sender. In one embodiment, an external electronic service is queried to determine the geographical location of a message sender. In various embodiments, the geographical location of a message sender is determined by looking up the location of the IP address associated with the message sender in a lookup table or by querying an electronic service. In one embodiment, the geographical path of a message is determined. In related embodiments, the geographical locations of hubs, routers, or gateways through which the email traveled are determined. In one embodiment, the information about hubs, routers, or gateways through which the email traveled is determined by parsing the message header. For example, in the context of FIG. 1 a data processing unit 110 parses the header of a message from a message sender in order to determine the geographical location of all hubs, routers, and gateways through which the email has traveled.

In an embodiment, as a result of processing the data related to one or more messages and senders in step 220, a prediction may be determined regarding whether a particular message sent by a particular message sender is unsolicited. Such a prediction may be based on any factor that is probative towards the likelihood that the particular message is unsolicited, such as one or more of the factors discussed above, or additional factors, such as the reputation of the sender, as discussed in U.S. patent application Ser. No. 10/857,641, filed on May 28, 2004. In other embodiments, no predictions are made as a result of processing the data related to one or more messages and senders in step 220; however, the analysis described above may be performed upon the data received or obtained in step 210 to enable another entity, such as a human or a computer process, to predict whether a particular message sent by a particular message sender is unsolicited.

In step 230, information related to email senders is made available. In various embodiments, the information is made available via a graphical user interface or an electronic interface. In various embodiments, the information is made available by responding to requests for information about message senders, by sending it to an interested party based on particular rules, or by making the data available in a public or private website.

In various embodiments, the graphical user interface, by which the information related to email senders is made available, is a web site, a graphical interface to a computer program, or any other appropriate graphical interface. In various embodiments, single items or multiple data items as described herein are presented in the graphical user interface. Examples of graphical user interfaces are depicted in FIGS. 4-13.

The information related to email senders may also be made available via an electronic interface. In one embodiment, the electronic interface is a DNS-like interface as described in Appendix B. Alternatively, any appropriate electronic interface may be used, including a web service, a rsync gateway, a FTP server, a HTTP server, a HTTPS server, a defined remote procedure call interface, a TCP/IP sockets interface, a UDP interface, or any other appropriate interface. For example, in the context of FIG. 1, a data processing unit 110 provides DNS interface 120 described in Appendix B.

In various embodiments, the information made available in step 230 may include any of the data received or obtained in step 210. In such an embodiment, any interested party, such as an email gateway, email client, or other any other appropriate process or entity, that receives or accesses the information made available in step 230 may predict or determine, using the information, whether a particular message sent by a particular message sender is unsolicited.

In other embodiments, the information made available in step 230 may include data obtained as a result of processing the data related to one or more messages and senders in step 220. For example, as a result of processing the data related to one or more messages and senders in step 220, data processing unit 111 may determine, using the above-described techniques, a prediction as to whether a particular message sent by a particular message sender is unsolicited. Data processing unit 111 may then provide that prediction to any interested party, such as email gateways, email clients, or other any other appropriate processes or entity. The prediction may be expressed in a variety of formats. For example, the prediction may be expressed using a numerical range from −10 to 10, where −10 indicates a low likelihood that the particular message is unsolicited, and 10 indicates a high likelihood that the particular message is unsolicited. In another example, the information made available in step 230 may include data describing the result of processing the data related to one or more messages and senders in step 220, e.g., FIG. 5 displays graphical user interface that shows both data received or obtained in step 210 (information displayed in the domain column) and the result of processing the data as performed in step 220 (information displayed in the estimated daily volume column).

Figure 2B:
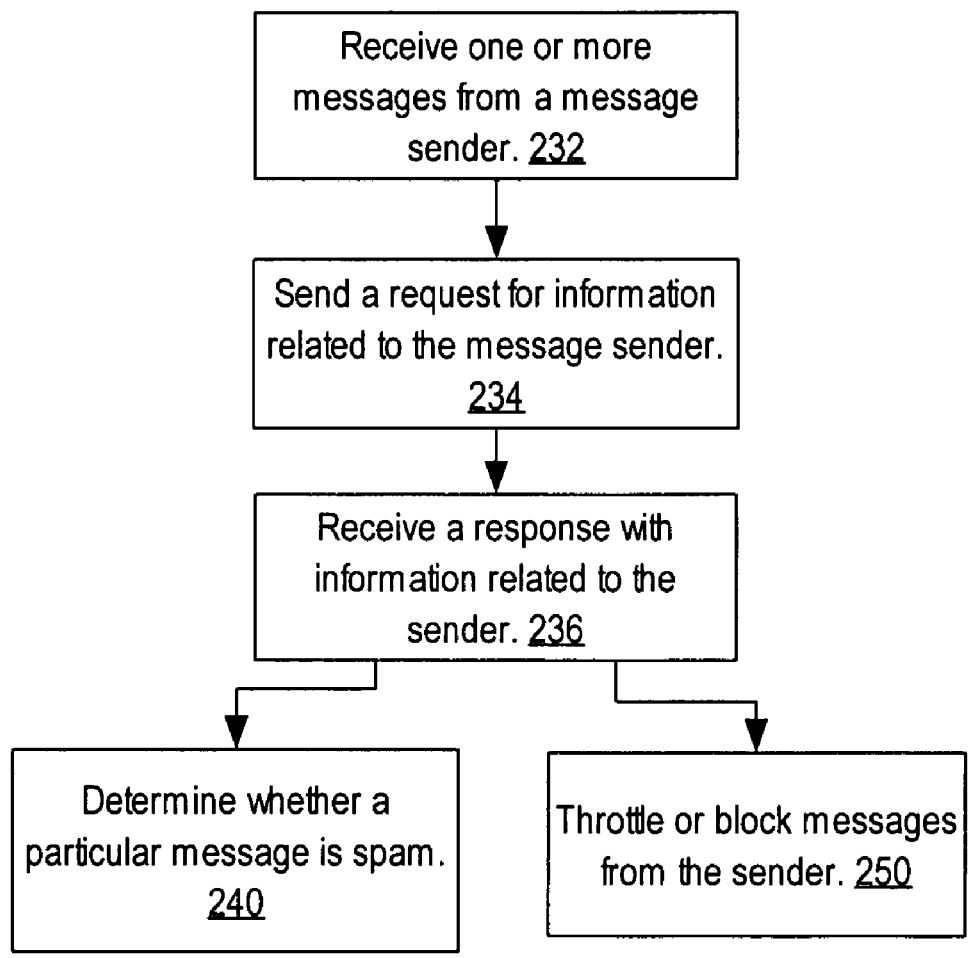
FIG. 2B is a flow diagram depicting a process for utilizing information related to electronic messages.

FIG. 2B is a flow diagram depicting a process for utilizing information related to electronic messages.

In various embodiments, the information related to email senders is made available to email gateways, email clients, or other any other appropriate processes or entity. There are numerous possible ways in which an email gateway, email client, or other process may use information made available in step 230. Example embodiments of such use are described herein with respect to FIG. 2B.

In step 232, one or more messages are received from a message sender. For example, in the context of FIG. 1, an email gateway 140A receives one or more email messages from a message sender.

In step 234, a request for information related to the message sender is sent. In one embodiment, the request is sent to a data processing unit. In related embodiments, the data processing unit utilizes the techniques described herein to determine the information related to the message sender. Example embodiments of determining information related to the message sender are described with respect to FIG. 2A and in other sections herein. The request and subsequent response may be sent in any appropriate format, including XML, HTML, a DNS-like format, or any proprietary format and may be sent using any appropriate communication protocol, including UDP, TCP/IP, HTTP, FTP, or HTTPS. For example, in the context of FIG. 1, an email gateway 140A sends a request for information about a message sender to a data processing unit 110 using a DNS-like interface over TCP/IP.

In step 236, a response is received with information related to the message sender. For example, in the context of FIG. 1, an email gateway 140A receives a response containing information about the message sender from a data processing unit 110 using a DNS-like interface over TCP/IP. A description of the information that may be received in step 236 is provided with respect to step 230, which describes the information that ultimately will be received in step 236.

Subsequent to receiving the information related to the message sender (in step 236), and depending on the implementation of the embodiment, the information may be used to aid in the determination of whether the particular message from the message sender is spam (step 240), whether to throttle messages from the message sender (step 250), or whether to block messages from the message sender (step 250).

In one embodiment, as part of step 240, the information received in step 236 is used to estimate whether an email message from a particular email sender is spam. In various embodiments, an email gateway or an email client obtains the information in order to aid the email gateway or email client in estimating whether a message sent by a particular email sender is spam. The information that an email gateway or email client uses to estimate whether an email message is spam may include any information described herein or any other appropriate information. For example, in the context FIG. 1, an email gateway 140A receives information from a data processing unit 110, and the information obtained includes the date of the first known request for information about the email sender and the magnitude value for the email sender. The email gateway 140A then estimates that an email message from the email sender is spam based on the fact that the IP address associated with the email sender has been owned by the network owner for only one week and there has been a large number of email requests from the email sender (as represented by a high magnitude value).

In other embodiments, as part of step 250, an email gateway, email client, or another process uses the information received in step 236 to determine whether to throttle or block messages from a message sender or network owner. Throttling may refer to the limitation of the number of messages delivered to recipients over a certain time period. In various embodiments, messages not sent immediately are placed in a queue for later sending, are placed in a "bulk mail" folder, are otherwise indicated as postponed, or are discarded. Blocking a message may include discarding a message or otherwise not forwarding a message to an intended message recipient. For example, in the context of FIG. 1, an email gateway 140A receives an email from a message sender, obtains information related to the message sender from a data processing unit 110 in step 236. The information obtained includes the network owner of the IP address corresponding to the message sender. The email gateway 140A uses the information to determine, based on number of messages received over the past 24 hours from the network owner, whether to block or throttle the email message.

Other decisions may be based on the information made available in step 230. For example, in one embodiment, a human operator views the information related to email senders and makes a decision about a message sender based upon the viewed information. For example, in the context of FIG. 1, a human user views the information related to email senders via a graphical user interface 130. The information depicts the number of messages that have been sent by a network owner over the past three months. The human user notices that the daily volume spikes on the seventh day of each month. According to the rules in the message gateway 140A, this drastic increase in volume would indicate that the email messages are estimated as spam and should be throttled or blocked. However, the monthly pattern that the human user notices prompts her to check the category for the network owner. The network owner turns out to be a Broadcast and Cable TV provider and the spike in email is due to the provider sending out electronic bills via email. The human operator may then specify a new rule in the email gateway 140A that indicates that on the seventh of each month, messages from the particular Broadcast Cable and TV provider should not be throttled.

Various embodiments of FIG. 2A and FIG. 2B may provide the benefit of collecting, aggregating, and managing information related to message senders. This information can be provided to end users, to system administrators, to messaging systems, or to any appropriate service or party. These services and parties may use this data as a basis for informed decision making related to particular messages and particular message senders.

Figure 3:
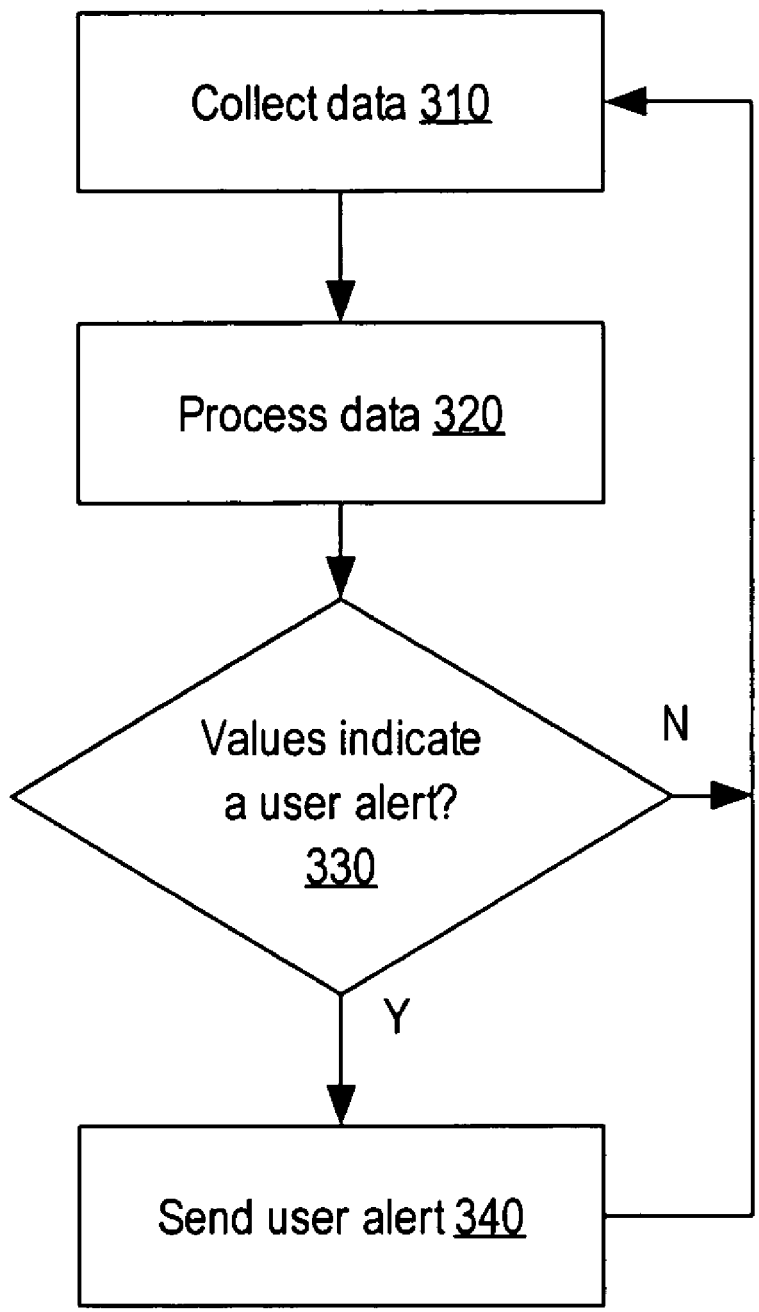
FIG. 3 is a flow diagram depicting a process for determining when to send alerts related to electronic messages.

FIG. 3 is a flow diagram depicting a process for determining when to send alerts related to electronic messages.

In step 310, the data related to email senders is obtained. Various embodiments of step 310 are described above with respect to step 210.

In step 320, the data related to email senders is processed. Various embodiments of step 320 are described above with respect to step 220.

In step 330, a check is performed to determine whether a user alert should be sent. A user alert is any condition, upon which the occurrence of, a user may be notified. In one embodiment, performing the check comprises determining whether a value or set of values related to a message sender, network operator, or network owner meet certain criteria. In various embodiments, performing the check comprises executing a database trigger, executing a "cron job" that checks values, executing a process or set of processes that check values, or any other appropriate mechanism. For example, in the context of FIG. 1, a data processing unit 110 executes a cron job that determines whether the list of network owners with the highest ten magnitude values have changed, and a user alert is sent, via email, to a human user that requested to be alerted when the highest ten magnitude values have changed. In another example, in the context of FIG. 1, a human user associated with a particular network owner that customarily sends very little email, subscribes via a GUI 130 to a user alert that will send a "page" to the human user if the particular network owner becomes one of the top 10,000 message senders in terms of volume of emails sent. The human user may choose to do this in order to aid in detection of a hacker using the one of the network owner's email gateways, email clients, or other processes, to send unsolicited messages.

If the determination is made in step 330 to send a user alert, then in step 340, a user alert is sent. In various embodiments, the user alert is sent via email, fax, telephone, page, TCP/IP, HTTP, HTTPS, UDP, FTP, or via any appropriate mechanism. The alert may be formatted in any appropriate manner. For example, in the context of FIG. 1, a data processing unit 110, after determining that a user alert should be sent in step 330, sends a page to a user associated with a particular network owner with a particular code and short human readable message, indicating that the volume of emails sent by the particular network owner has exceeded a predefined threshold.

After the user alert has been sent in step 340, or if no user alerts need to be sent in step 330, then data related to email senders is collected in step 310. In various embodiments, data related to information about email senders is collected continually or continuously.

Various embodiments of FIG. 3 may be used for actively alerting end users, administrators, and various processes and systems when alert-worthy events happen. Further, based on the particular alert, important messages may be made related to the messaging system. For example, detecting that there is a sudden spike in message volume outbound from a particular system may aid a system administrator in determining that one of the servers in the system have been hijacked.

5.0 Graphical User Interface Examples

In various embodiments, information displayed in FIG. 4-13 may be generated by a data processing unit or a process communicatively coupled thereto based on data stored a database. For example, in the context of FIG. 1, the interface pages of FIG. 4-FIG. 13 are generated by a data processing unit 110 as part of a GUI 130 based on data stored in a database 111.

Figure 4:
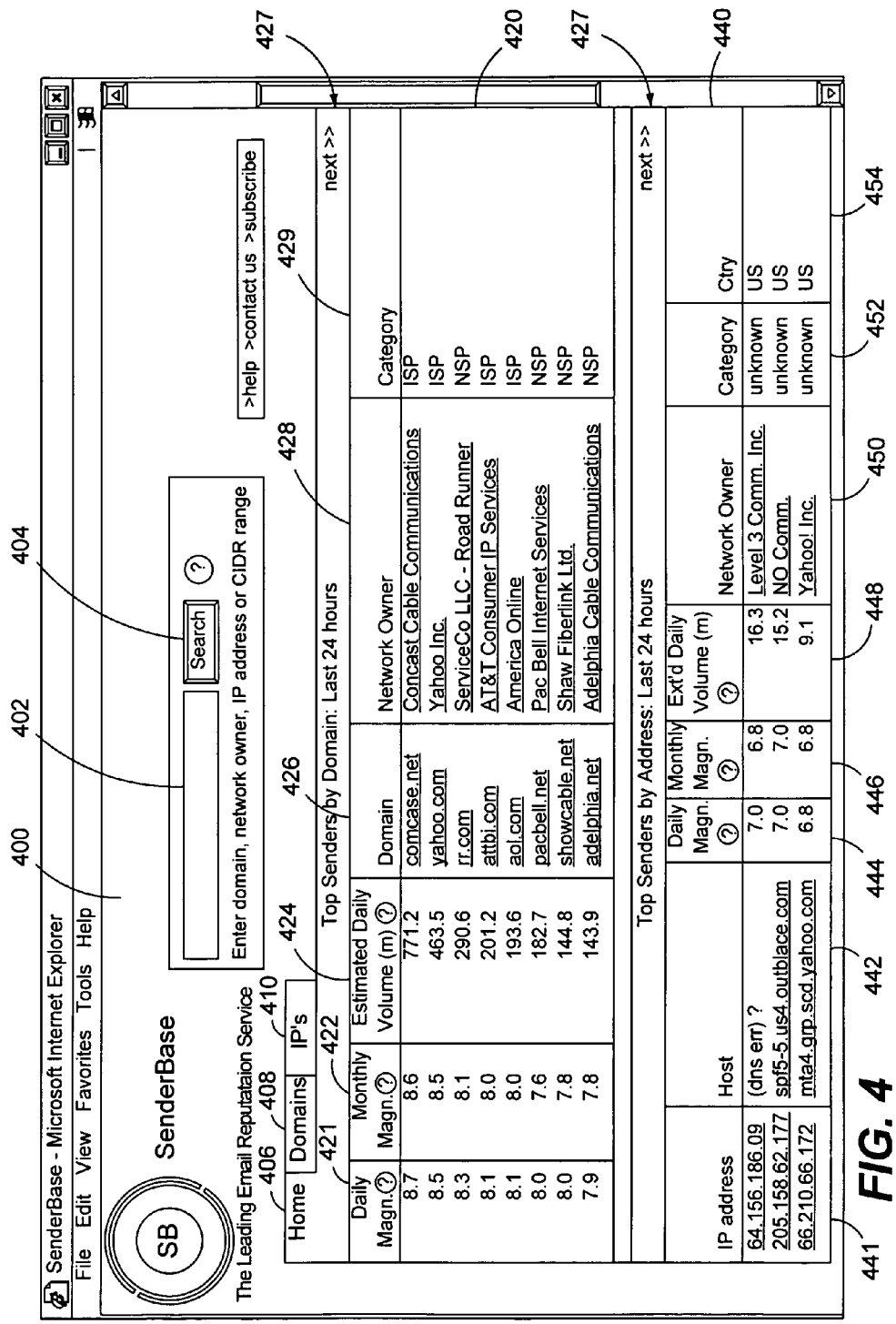
FIG. 4 is an illustration of a first graphical user interface (GUI) page, which depicts an example home page for a data processing unit.

FIG. 4 is an illustration of a first GUI page 400, which depicts an example home page for a data processing unit.

The first GUI page 400 includes a text entry section 402, a search indicator 404, a home tab 406, a domains tab 408, an IP's tab 410, a domain volume table 420, and a top senders by address table 440. The first GUI page 400, and all other GUI pages described herein, may be formatted in a markup language such as HTML, XML, or any other appropriate format or language. The placement of items on the GUI page 400 and all other GUI pages described herein is in no way limiting to the techniques described herein and are provided for illustrative purposes only. In various embodiments, the first GUI page 400 is provided by a data processing unit or a process thereto communicatively coupled. For example, in the context of FIG. 1, the data processing unit 110 provides the first GUI page 400.

The text entry section 402 enables entry of text on the first GUI page 400. In one embodiment, a human operator using the first GUI page enters text using a computer and keyboard into the text entry section 402. In various embodiments, the search indicator 404 is a selectable link, a selectable button, or other means for indicating an action on the first GUI page 400. In one embodiment, selecting the search indicator 404 causes a search of database of message sender information to be performed based on the text in the text entry section 402. In various related embodiments, the search will be performed to find a domain name, network owner, IP address, or Classless Inter-Domain Routing (CIDR) range indicated by the text in the text entry section 402.

The home tab 406, domains tab 408, IP's tab 410 are each selectable elements of the first GUI page 400. In one embodiment, the home tab 406, domains tab 408, IP's tab 410 are selectable by adjusting a computer mouse to position a pointer above the tab to be selected and pressing a button on the computer mouse. In various embodiments, selection of the home tab causes the first GUI page 400 to be displayed, selection of the domains tab 408 causes the seventh GUI page 1000 to be displayed, selection of the IP's tab 410 causes the eighth GUI page 1100 to be displayed.

The domain volume table 420 includes one or more selectable navigation elements 427 and six columns: a daily magnitude column 421, a monthly magnitude column 422, an estimated daily volume column 424, a domain column 426, a network owner column 428, and a category column 429. In one embodiment, selection of a selectable navigation element 427 causes the first GUI page 400 to be displayed. In related embodiments, the next X highest or lowest volume domains are displayed when the navigator element 427 is selected, where X is the number of domains displayed in the domain volume table 420.

The daily magnitude column 421 provides a number calculated based on the daily volume of messages sent by senders associated with the corresponding domain in the domain column 426 as recorded in a database of message sender information. The monthly magnitude column 422 provides a number calculated based on the monthly volume of messages sent by senders associated with the corresponding domain in the domain column 426. Various example volume calculations are given above in the section entitled Example Information Related to Email Senders and in other sections herein.

The estimated daily volume column 424 provides an estimated number of messages sent by senders associated with the corresponding domain in the domain column 426. In one embodiment, the estimated daily volume is calculated as described with respect to the Estimated Total Number of Messages over Time T, where time T is one day. The domain column 426 provides domain names associated with the data in the other columns 421, 422, 424, 428, and 429. In one embodiment, one or more entries in the domain column 426 provide a selectable link. In a related embodiment, a selectable link, when selected, causes a second GUI page 500 corresponding to the selected domain to be displayed. In various embodiments, selectable links or mechanisms described herein refer to selectable XML or HTML links, selectable XML or HTML buttons, or any other appropriate selectable mechanism.

The network owner column 428 provides the name of the network owner associated with the data in the other columns 421, 422, 424, 426, and 429. In one embodiment, one or more entries in the network owner column 428 provide a selectable link. In a related embodiment, a selectable link, when selected, causes a third GUI page 600 corresponding to the selected network owner to be displayed. The category column 429 provides a category associated with each network owner listed in the network owner column 428.

The top senders by address table 440 includes one or more navigation elements 427 and eight columns: an IP address column 441, a host column 442, a daily magnitude column 444, a monthly magnitude column 446, an estimated daily volume column 448, a network owner column 450, a category column 452, and a country column 454. The daily magnitude column 444, monthly magnitude column 446, estimated daily volume column 448, network owner column 450, and category column 452 operate with the functions and characteristics that are described above with respect to columns 421, 422, 424, 428, and 429 respectively.

The IP address column 441 provides the IP address corresponding to the information in the other columns 442, 444, 446, 448, 450, 452, and 454. In one embodiment, one or more entries in the IP address column 441 provide a selectable link. In a related embodiment, a selectable link, when selected, causes a fourth GUI page 700 corresponding to the selected IP address to be displayed.

The host column 442 provides a host name corresponding to the IP address in IP address column 441. In one embodiment, if no hostname is associated with the IP address, an error message such as the text "(dns err)?" is displayed. In one embodiment, one or more entries in the host column 442 provide a selectable link. In a related embodiment, each selectable link, when selected, causes a ninth GUI page 1200 corresponding to the selected host name to be displayed.

Country column 454 provides the country in which the corresponding IP address in IP address column 441 is located. The country name may be abbreviated.

Figure 5:
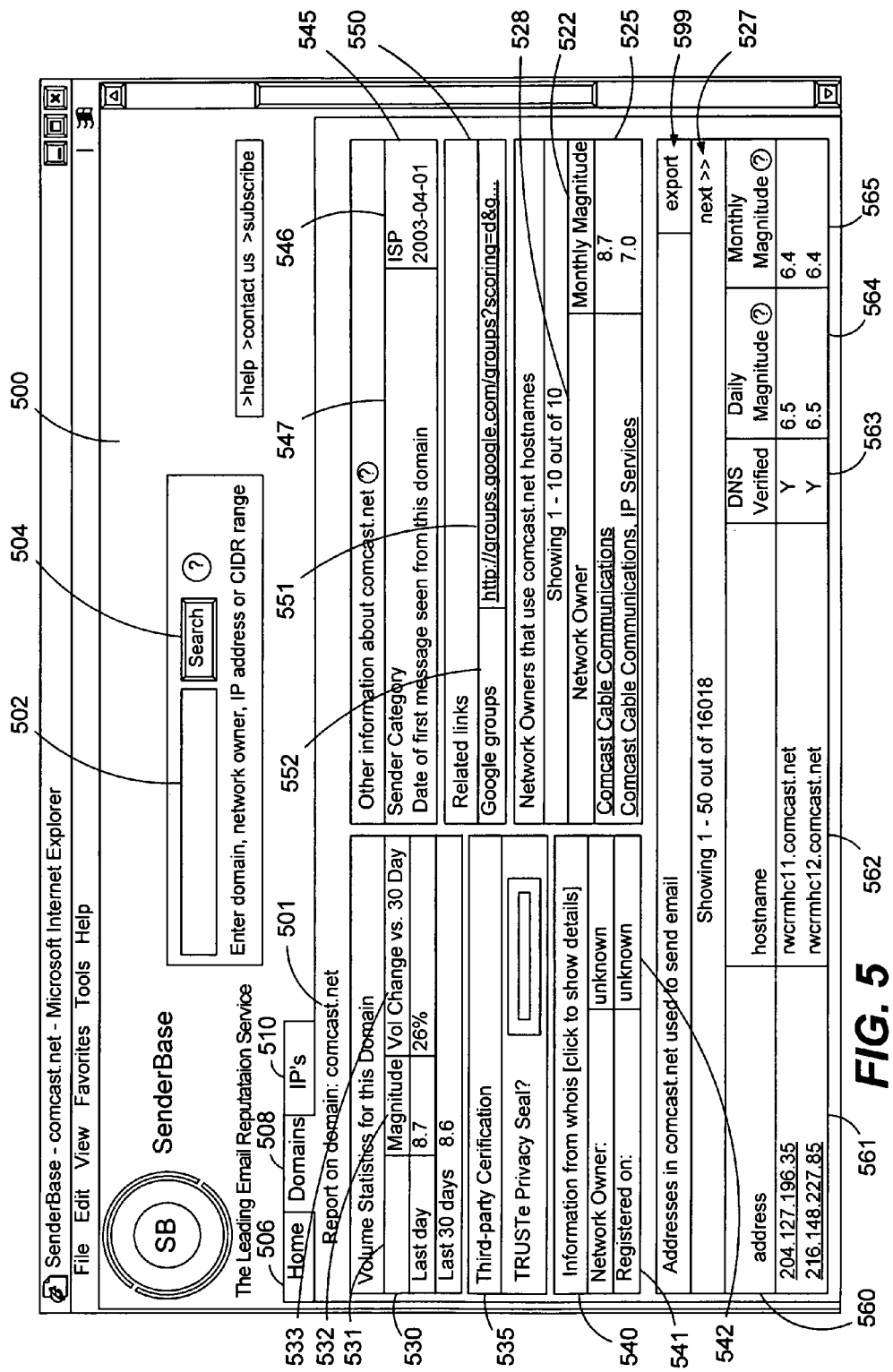
FIG. 5 is an illustration of a second GUI, which depicts an example domain name page for a data processing unit.

FIG. 5 is an illustration of a second GUI page 500, which depicts an example domain name page for a data processing unit.

The second GUI page 500 includes a text entry area 502, a each selection mechanism 504, a home tab 506, a domain tab 508, and an IP's tab 510, all of which operate with the functions and characteristics that are described above in the context of 402, 404, 406, 408, and 410, respectively.

The second GUI page 500 includes a domain name indicator 501, a volume statistic table 530, a third party certificate table 535, an information from whois table 540, an addresses used to send email table 560, a network owner table 525, a related links table 550, and an other information table 545. The domain name indicator 501 indicates to what domain name this page refers. The domain name indicator 501 may be text in HTML, XML, plain text, or any other format usable by the second GUI page 500.

The volume statistic table 530 includes a time span column 531, a magnitude column 532, and a volume change verses particular time span column 533. The time span column 531 contains entries indicating the duration to which the entries in that row apply. The magnitude column 532 indicates a volume statistic for the time duration indicated in column 531 for the domain name indicated by the domain name indicator 501. Values for the volume statistic column are described above with respect to columns 421 and 422. The volume change verses particular time span column 533 indicates the difference between the volume statistic in the particular row and the volume statistic for the particular time span. In various embodiments, the particular time span is 30 days or is the total span of time for which data exists for a particular entity. In one embodiment, the change is indicated as a percentage difference of the volume statistic of column 532 compared to the last 30 days.

The third party certificate table 535 contains rows that indicate what self-governing trust site, Public Key Encryption, or other trusted site privacy or verification certificates are held by the domain of domain name indicator 501.

The information from the whois table 540 indicates registration information about the domain indicated by domain name indicator 501. Whois table 540 includes a whois key column 541 and a whois value column 542. The whois value column 542 indicates the values corresponding to the key information in whois key column 541. In one embodiment, the values in the whois key column 541 and whois value column 542 are received by executing performing a "whois" search. The other information table 545 includes an information key column 547, and an information value column 546. The information value column 546 contains values corresponding to values in the information key column 547. The related links table 550 indicates links that are related to the domain name indicated in the domain name indicator 501.

The network owner table 525 indicates the network owners that correspond to the domain name indicated by the domain name indicator 501. The network owner table 525 includes a network owner column 528 and a monthly magnitude column 522. The network owner column 528 and monthly magnitude column 522 are described above with respect to columns 428 and 422, respectively.

The addresses used to send email table 560 includes a selectable export mechanism 599, a selectable navigation mechanism 527, an address column 561, a hostname column 562, a DNS verified column 563, a daily magnitude column 564, and a monthly magnitude column 565. The addresses used to send email table 560 provides information about IP addresses associated with the domain name indicated in the domain name indicator 501. The selectable export mechanism 599, when selected, provides the tenth GUI page 1300. In various embodiments, the selectable export mechanism 599 is a HTML link, an XML link, a GUI button, or any appropriate GUI selection mechanism. The selectable navigation mechanism 527 is described above with respect to element 427.

The address column 561 is described above with respect to column 441. The hostname column 562 lists host names corresponding to the IP addresses in the address column 561. The DNS verified column 563 indicates whether the domain name in the hostname column has been verified for the IP address in the address column 561. The daily magnitude column 564 and the monthly magnitude column 565 operate with the functions and characteristics that are described above with respect to columns 421 and 422, respectively.

Figure 6:
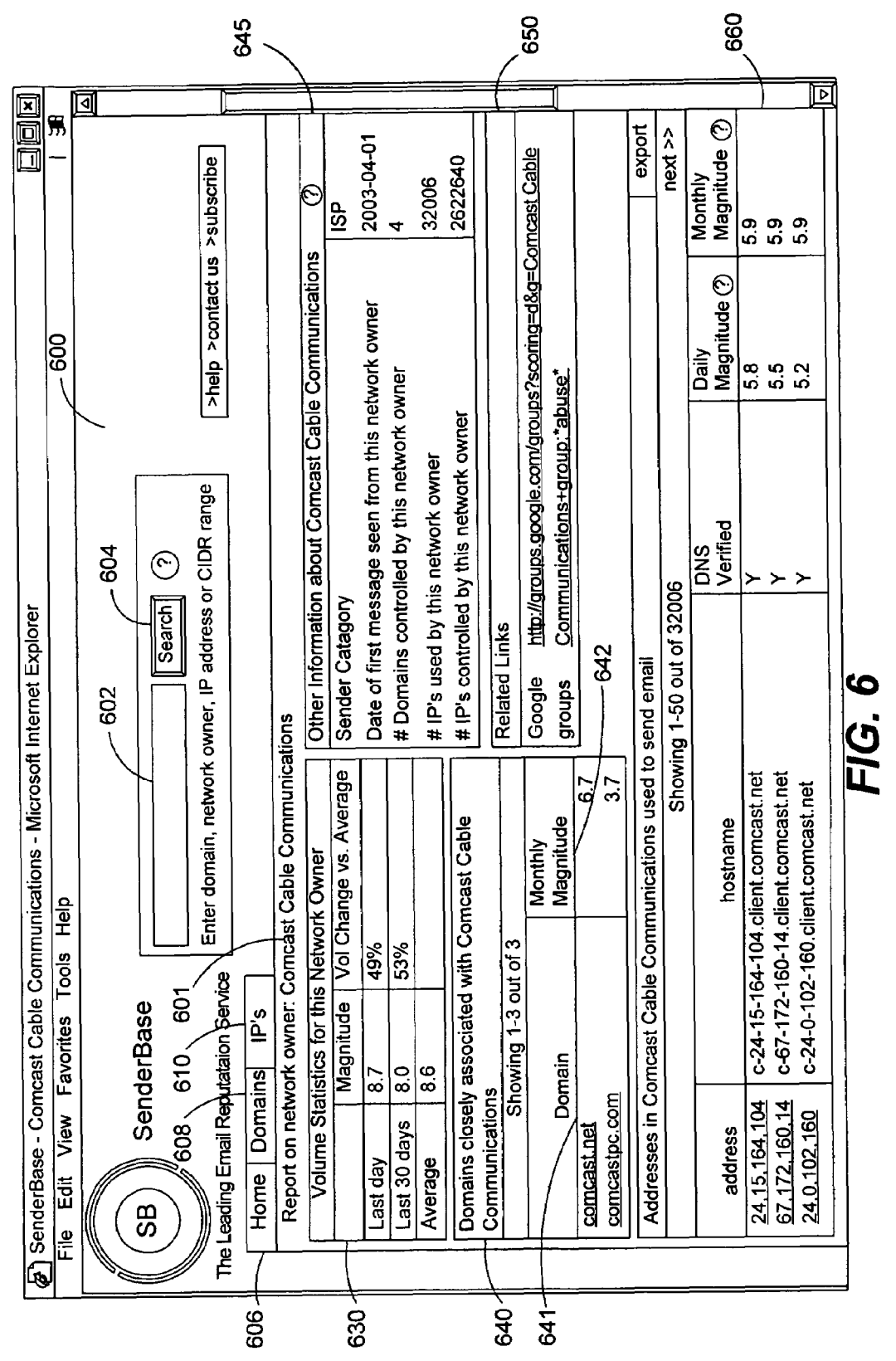

FIG. 6 is an illustration of a third GUI page 600, which depicts an example network owner page for a data processing unit.

The third GUI page 600 includes a text entry mechanism 602, a selectable search mechanism 604, a home tab 606, domain tab 608, IP's tab 610, a volume statistic table 630, an other information table 645, a related links table 650, and an addresses used to send email table 660, which are described above with respect to corresponding tabs, mechanisms, and tables 402, 404, 406, 408, 410, 530, 545, 550, and 560, respectively. The third GUI page 600 provides information for a particular network owner.

The third GUI page 600 includes a network owner indicator 601 and a closely associated domains table 640, which includes a domain column 641 and a monthly magnitude column 642. The network owner indicator 601 indicates the network owner to which information on this page applies. The network owner indicator may be text in HTML, XML, plain text or any other format usable by the third GUI page 600. The closely associated domains table 640 provides information for domains associated with the network owner indicated by the network owner indicator 601. The domain column 641 and the magnitude column 642 are described above with respect to 426 and 422, respectively.

Figure 7:
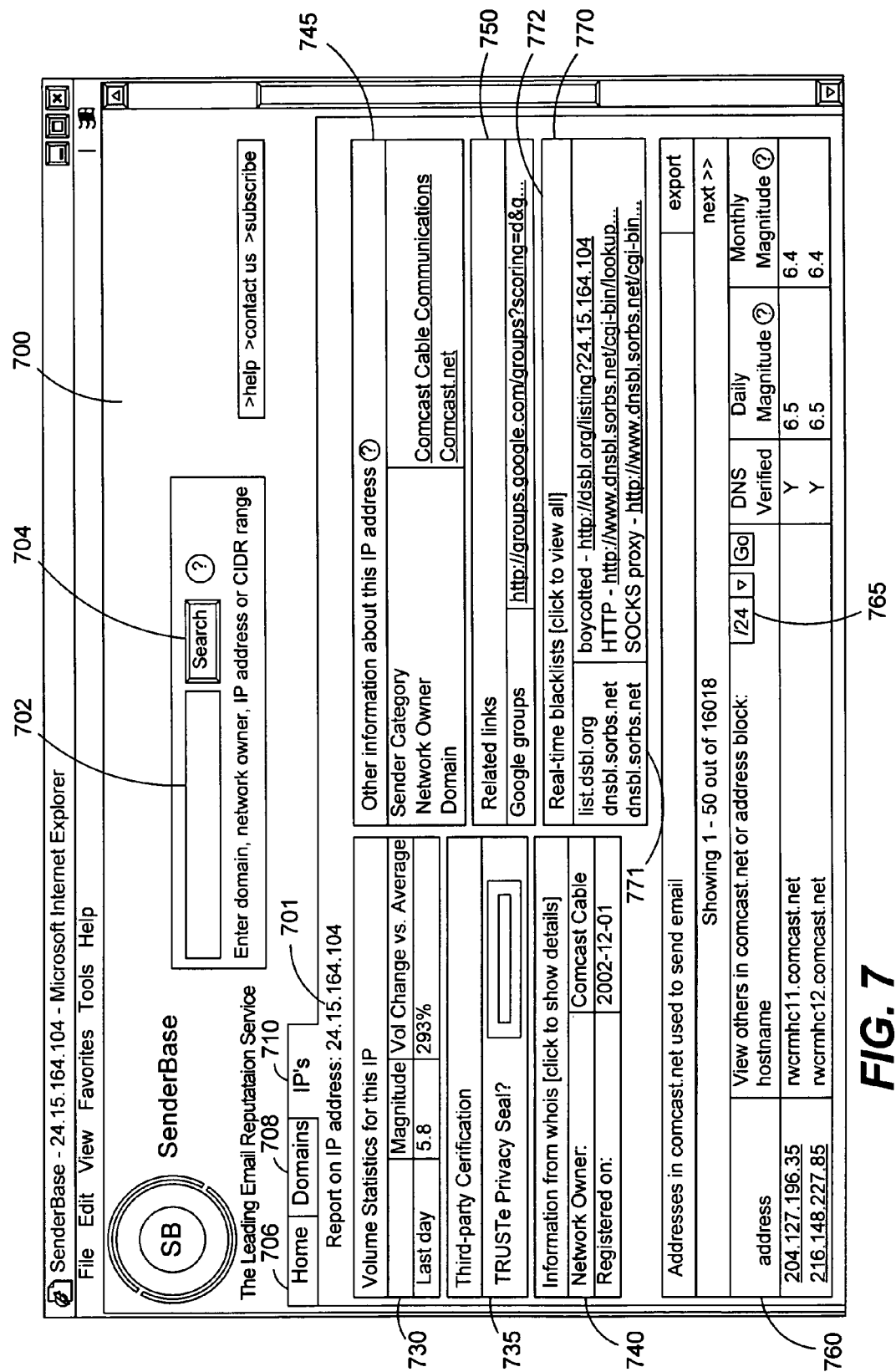
FIG. 7 is an illustration of a fourth GUI page, which depicts an example IP address page for a data processing unit.

FIG. 7 is an illustration of a fourth GUI page 700, which depicts an example IP address page for a data processing unit.

The fourth GUI page 700 includes a text entry mechanism 702, a selectable search mechanism 704, a home tab 706, domain tab 708, an IP's tab 710, a volume statistic table 730, a third party certificate table 735, an information from whois table 740, an other information table 745, a related links table 750, and an addresses used to send email table 760, which are described above with respect to mechanisms, tabs, and tables 402, 404, 406, 408, 410 530, 535, 540, 545, 550, and 560, respectively. The third fourth GUI page 700 provides information for a particular IP address indicated by the IP address indicator 701. In addition to the described elements for table 560, the addresses used to send email table 760 includes a scope selection mechanism 765. The scope selection mechanism may be any appropriate selection mechanism that enables a user to select a number of bits. The number of bits selected with the scope selection mechanism 765 indicates the number of high-order significant bits used to select items to display in the addresses used to send email table 760. For example, if the scope selection mechanism 765 indicates 24 bits, then only IP addresses with the same 24 high-order bits as the IP address indicated in 701 will be displayed. The IP address indicator 701 indicates the IP address to which information on this page applies. The IP address indicator 701 may be text in HTML, XML, plain text or any other format usable by the fourth GUI page 700.

The fourth GUI page 700 includes a real-time blacklist table 770, which includes a blacklist name column 771 and a further information column 772. The blacklist table 770 indicates zero or more blacklists to which the IP address belongs. The blacklist name column 771 lists the blacklists containing the IP address indicated in the IP address indicator 701. The further information column 772 contains selectable links or text related to each blacklist in the blacklist name column 771.

Figure 8:
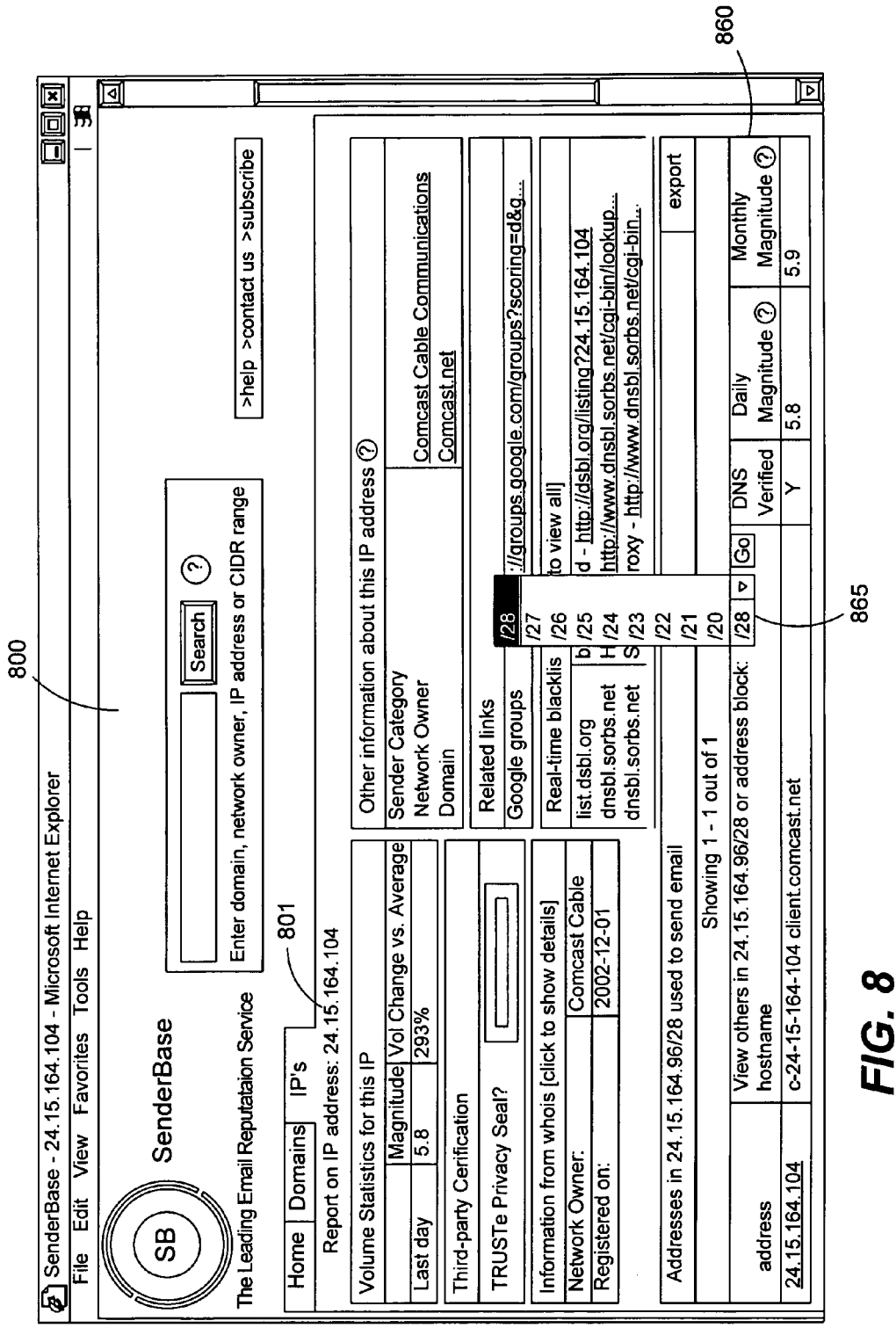
FIG. 8 is an illustration of a fifth GUI page, which depicts another example IP address page for a graphical user interface for a data processing.

FIG. 8 is an illustration of a fifth GUI page 800, which depicts another example IP address page for a data processing unit.

The fifth GUI page 800 is described above with respect to fourth GUI page 700. In particular, IP address indicator 801, addresses used to send email table 860, and scope selection mechanism 865 are described above with respect to indicator 701, table 760, and mechanism 765, respectively. In the fifth GUI page 800, a scope of 28 bits has been selected using the scope selection mechanism 865. Therefore, in the addresses used to send email table 860, only those addresses that share 28 high-order bits with the IP address indicated in the IP address indicator 801 are shown.

Figure 9:
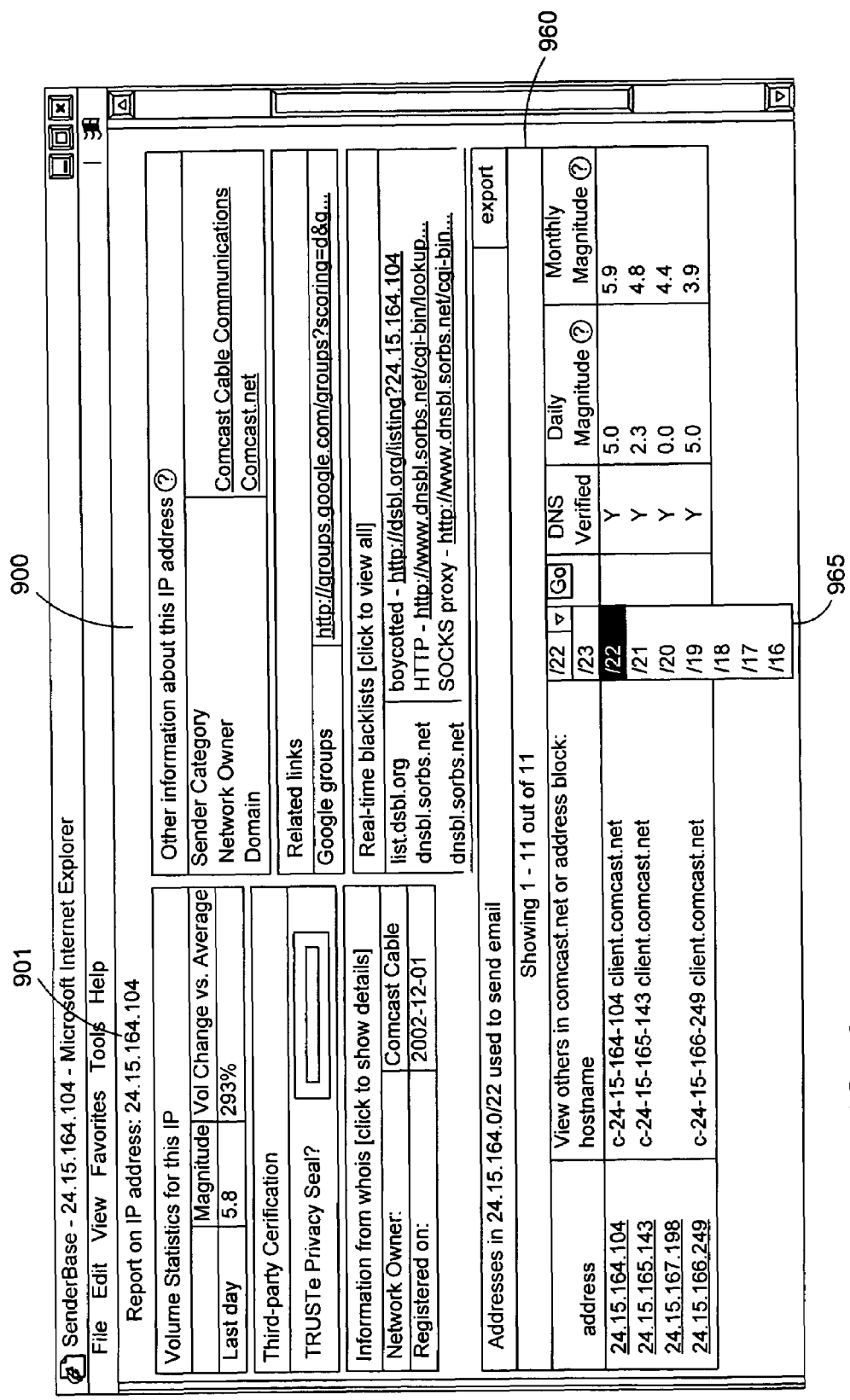
FIG. 9 is an illustration of a sixth GUI page, which depicts another example IP address page for a data processing unit.

FIG. 9 is an illustration of a sixth GUI page 900, which depicts another example IP address page for a data processing unit.

The sixth GUI page 900 is described above with respect to fourth GUI page 700. In particular, IP address indicator 901, addresses used to send email table 960, and scope selection mechanism 965 are described above with respect to indicator 701, table 760, and mechanism 765, respectively. In the sixth GUI page 900, a scope of 22 bits has been selected using the scope selection mechanism 965. Therefore, in the addresses used to send email table 960, only those addresses that share 22 high-order bits with the IP address indicated in the IP address indicator 901 are shown. Note that more IP addresses are included in the sixth GUI page 900 than in the fifth GUI page 800, due to the difference in bit scope.

Figure 10:
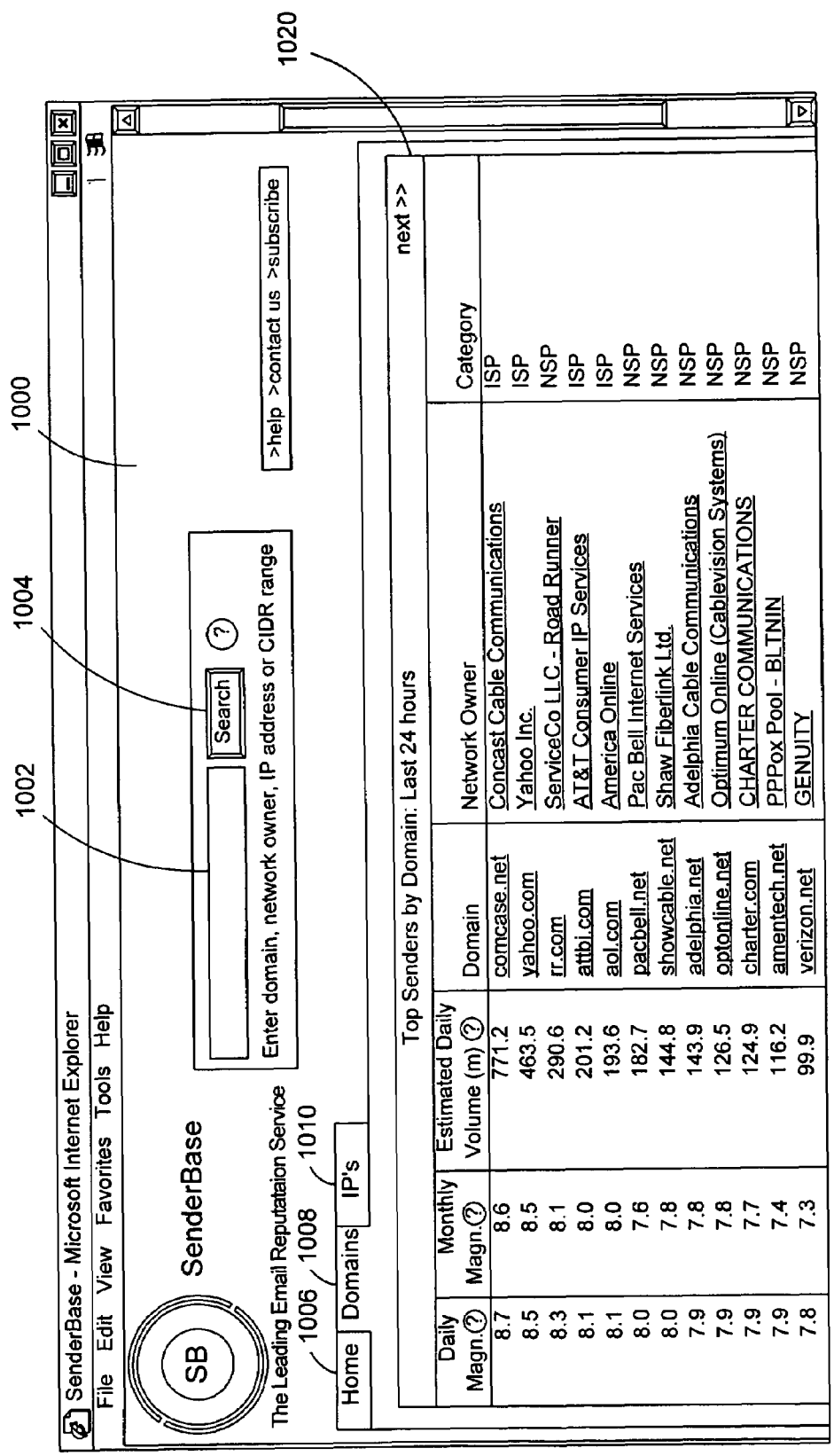
FIG. 10 is an illustration of a seventh GUI page, which depicts an example domain name page for a data processing unit.

FIG. 10 is an illustration of a seventh GUI page 1000, which depicts an example domain name page for a data processing unit.

The seventh GUI page 1000 includes a text entry mechanism 1002, a search selection mechanism 1004, a home tab 1006, a domains tab 1008, an IP's tab 1010, and a top senders table 1020, which are described above with respect to mechanisms, tables, and tabs 403, 404, 406, 408, 410, and 420, respectively. The seventh GUI page 1000 describes information about the top email senders over the last 24 hours by domain.

Figure 11:
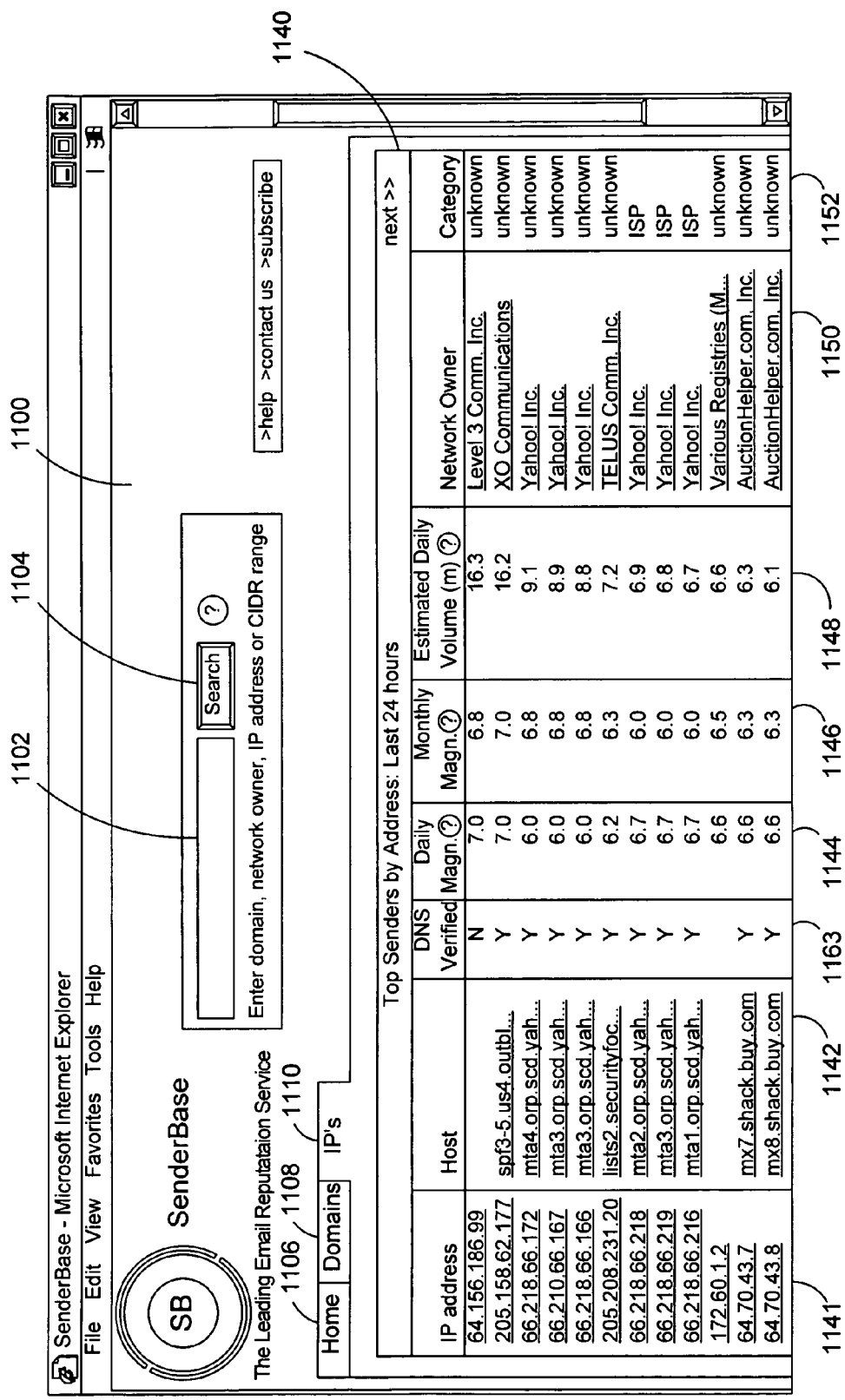
FIG. 11 is an illustration of an eighth GUI page, which depicts an example IP address main page for a data processing unit.

FIG. 11 is an illustration of an eighth GUI page 1100, which depicts an example IP address main page for a data processing unit.

The eighth GUI page 1100 includes a text entry mechanism 1102, a selectable search mechanism 1104, a home tab 1106, a domains tab 1108, an IP's tab 1110, and a top senders by IP address table 1140. The text entry mechanism 1102, selectable search mechanism 1104, home tab 1106, domains tab 1108, and IP's tab 1110 are described above with respect to mechanisms and tabs 402, 404, 406, 408, and 410, respectively. The top senders by IP address table 1140 indicates the top senders of email by IP address. The top senders by IP address table 1140 includes an IP address column 1141, host column 1142, DNS verified column 1163, daily magnitude column 1144, monthly magnitude column 1146, estimated daily volume column 1148, network owner column 1150, and category column 1152 are described above with respect to columns 441, 442, 563, 444, 446, 448, 450, and 452, respectively.

Figure 12:
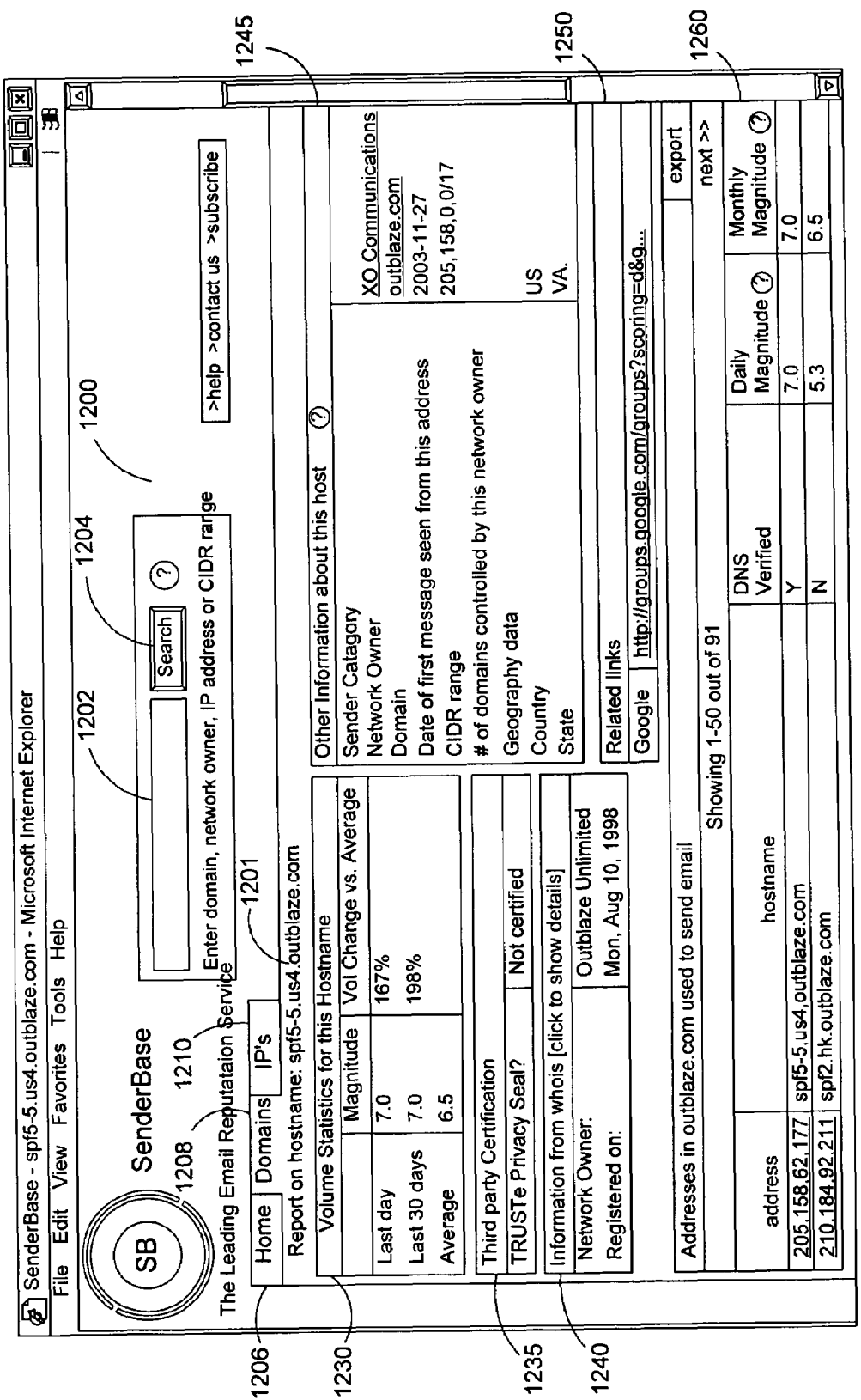
FIG. 12 is an illustration of a ninth GUI page, which depicts an example hostname page for a data processing unit.

FIG. 12 is an illustration of a ninth GUI page 1200, which depicts an example hostname page for a data processing unit.

The ninth GUI page 1200 includes a hostname indicator 1201, which indicates the hostname to which all of the information on the ninth GUI page 1200 refers. The ninth GUI page 1200 includes a text entry mechanism 1202, a selectable search mechanism 1204, a home tab 1206, a domains tab 1208, an IP's tab 1210, a volume statistics table 1230, a third party certificate table 1235, an information from whois table 1240, an other information about this host table 1245, a related links table 1250, and an addresses used to send email table 1260, which are described above with respect to mechanisms, tables, and tabs 402, 404, 406, 408, 410, 530, 535, 540, 545, 550, and 560, respectively.

Figure 13:
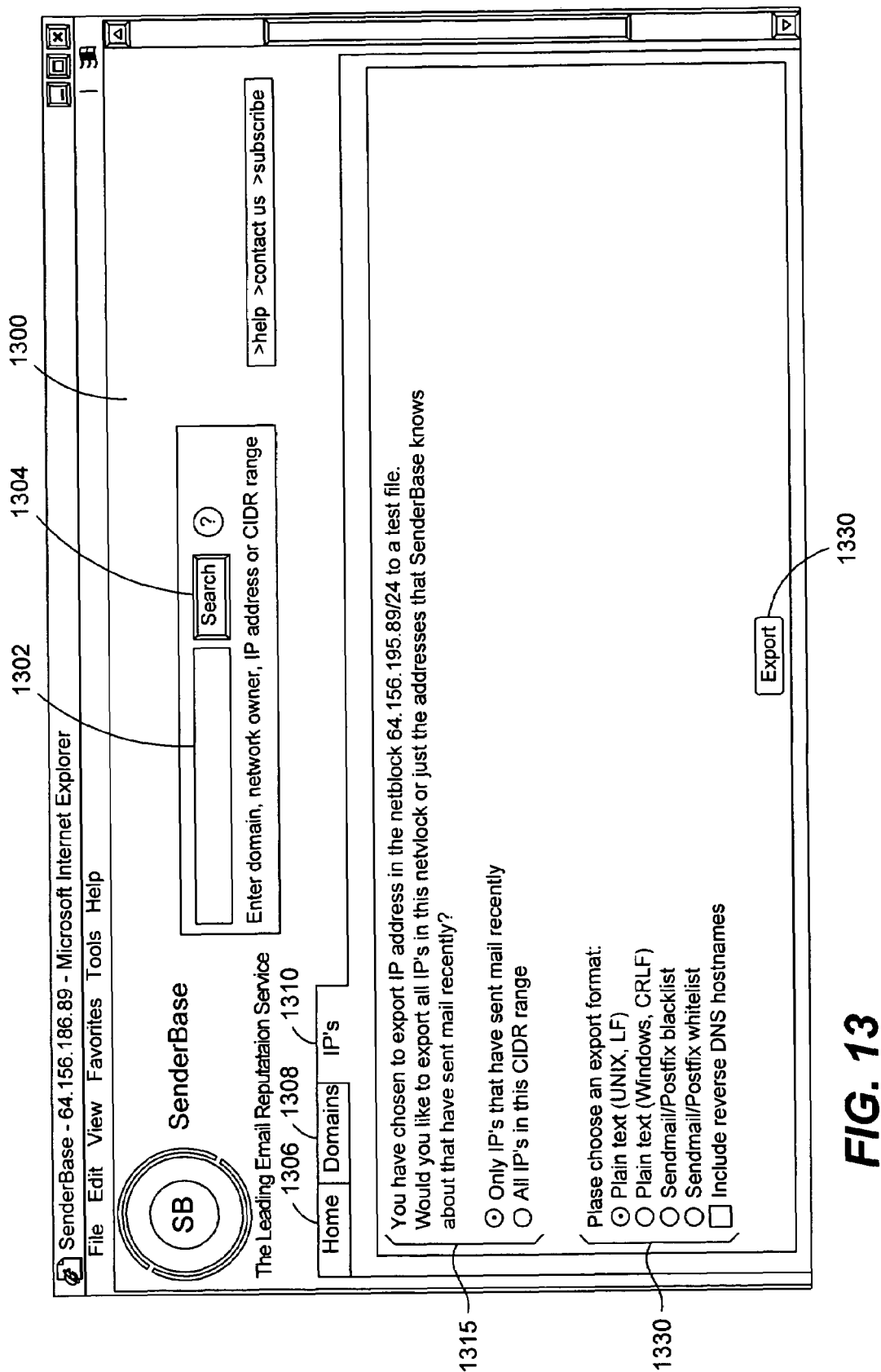
FIG. 13 is an illustration of a tenth GUI page, which depicts an example export page for a data processing unit.

FIG. 13 is an illustration of a tenth GUI page 1300, which depicts an example export page for a data processing unit.

The tenth GUI page 1300 provides an interface for choosing what data to export and the format in which to export it. The tenth GUI page 1300 includes a text entry mechanism 1302, a selectable search mechanism 1304, a home tab 1306, a domains tab 1308, and an IP's tab 1310, which are described above with respect to mechanisms and tabs 402, 404, 406, 408, and 410. The tenth GUI page 1300 includes a data selection area 1315, a format selection area 1320, and a selectable export mechanism 1330. In one embodiment, the data selection area 1315 includes text describing the type of data that may be exported and a selection mechanism enabling a human user to select among the types of data that may be exported. In related embodiments, the selection mechanism is an HTML radio box, an XML radio box, or any other appropriate selection mechanism. In one embodiment, the types of data include all IP addresses in a range of IP address, or a set of IP addresses that are known to have sent email recently. In one embodiment, the format selection area 1320 includes text describing the one or more formats in which the data may be exported and a selection mechanism enabling a human user to select among the types of data that may be exported. In related embodiments, the selection mechanism is an HTML radio box, an XML radio box, or any other appropriate selection mechanism.

The selectable export mechanism 1330, when selected, causes the data selected in the data selection area 1315 to be exported in the format identified on the format selection area 1320. In various embodiments, the export selection mechanism 1330 is a HTML or XML link, a HTML or XML button, or any other appropriate selection mechanism.

6.0 Implementation Mechanisms—Hardware Overview

Figure 14:
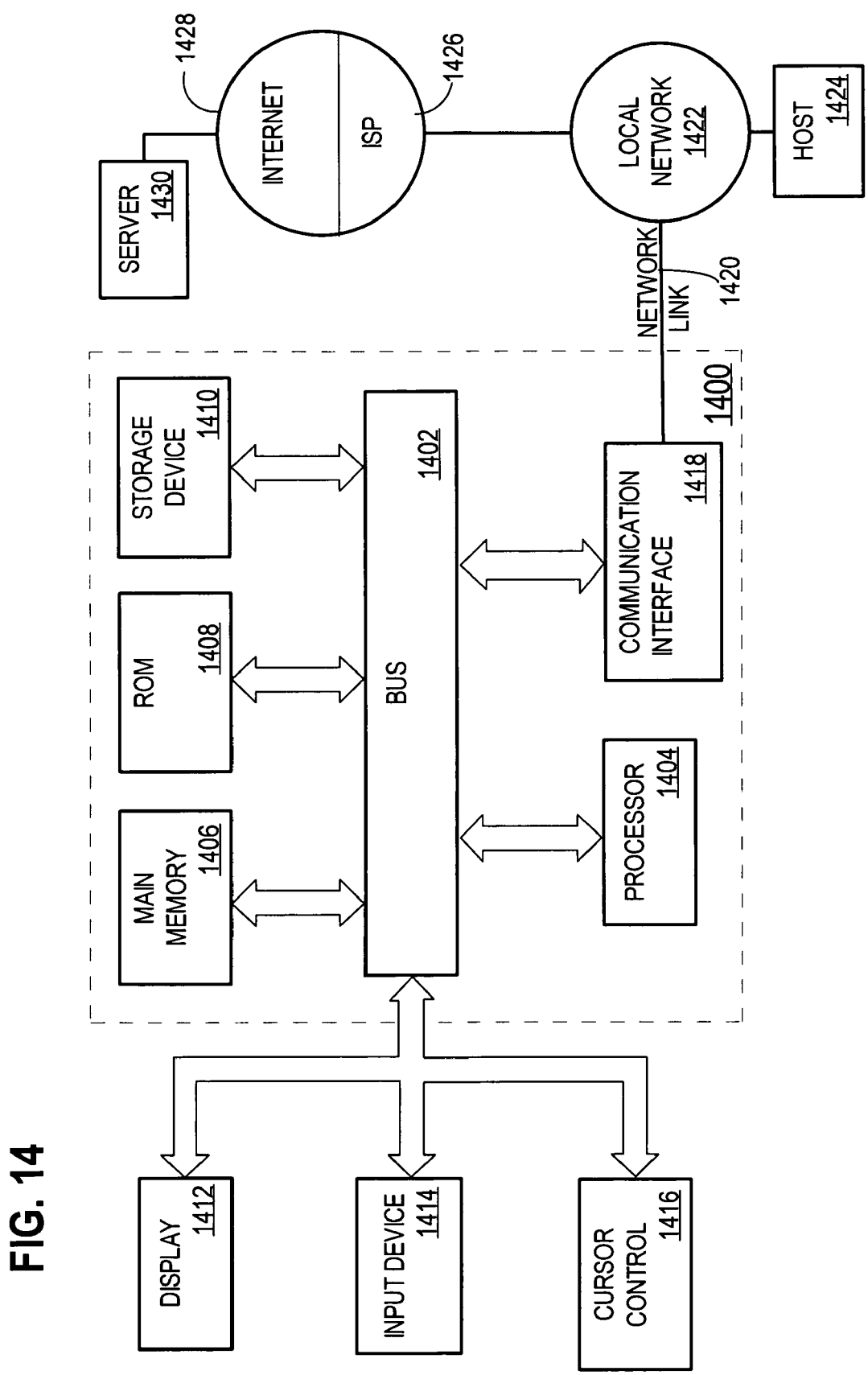
FIG. 14 is a block diagram that illustrates a computer system upon which an embodiment of the invention may be implemented.

FIG. 14 is a block diagram that illustrates a computer system 1400 upon which an embodiment of the invention may be implemented. Computer system 1400 includes a bus 1402 or other communication mechanism for communicating information, and a processor 1404 coupled with bus 1402 for processing information. Computer system 1400 also includes a main memory 1406, such as a random access memory ("RAM") or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory ("ROM") 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube ("CRT"), for displaying information to a computer user. An input device 1414, including alphanumeric and other keys, is coupled to bus 1402 for communicating information and command selections to processor 1404. Another type of user input device is cursor control 1416, such as a mouse, trackball, stylus, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

The invention is related to the use of computer system 1400 for electronic message delivery approaches. According to one embodiment of the invention, electronic message delivery approaches are provided by computer system 1400 in response to processor 1404 executing one or more sequences of one or more instructions contained in main memory 1406. Such instructions may be read into main memory 1406 from another machine-readable medium, such as storage device 1410. Execution of the sequences of instructions contained in main memory 1406 causes processor 1404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infrared transmitter to convert the data to an infrared signal. An infrared detector can receive the data carried in the infrared signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network ("ISDN") card or a modem to provide a data communication connection to a corresponding type of telephone line. As another example, communication interface 1418 may be a local area network ("LAN") card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider ("ISP") 1426. ISP 1426 in turn provides data communication services through the worldwide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418. In accordance with the invention, one such downloaded application provides for electronic message delivery approaches as described herein.

The received code may be executed by processor 1404 as it is received, and/or stored in storage device 1410, or other non-volatile storage for later execution. In this manner, computer system 1400 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Appendix A: Sample Categories

| | | |
|---|---|---|
| Advertising | Discussion Lists | Motion Pictures |
| Aerospace & Defense | Diversified Financial | Natural Gas Utilities |
| Air Courier | Services | News |
| Airlines | eCommerce | Non-profit |
| Apparel | Electric Utilities | NSP |
| Apparel/Accessories | Electronic Instr. & | Office Equipment |
| Appliance & Tool | Controls | Office Supplies |
| Audio & Video Equipment | Email Delivery | Oil & Gas Operations |
| Auto & Truck Manufacturers | Email Marketing | Oil Well Services & |
| | Engineering Consultants | Equipment |
| Auto & Truck Parts | Fabricated Plastic & | Online Media |
| Beverages (Alcoholic) | Rubber | Paper & Paper Products |
| Beverages (Non-Alcoholic) | Fish/Livestock | Personal & Household |
| | Food Processing | Prods. |

-continued

| | | |
|---|---|---|
| Biotechnology & Drugs | Footwear | Personal Services |
| Broadcasting & Cable TV | Forestry & Wood Products | Photography |
| Business Services | Furniture & Fixtures | Printing & Publishing |
| Career | Gold & Silver | Printing Services |
| Casinos & Gaming | Government | Railroads |
| Chemical Manufacturing | Government Agency | Real Estate Operations |
| Chemicals - Plastics & Rubber | Healthcare Facilities | Recreational Activities |
| | Hosting | Recreational Products |
| Coal | Hotels & Motels | Rental & Leasing |
| Commercial Banks | Insurance (Accident & Health) | Restaurants |
| Communications | | Retail (Apparel) |
| Communications Equipment | Insurance (Life) | Retail (Catalog & Mail Order) |
| | Insurance (Miscellaneous) | |
| Communications Services | Insurance (Property & Casualty) | Retail (Department & Discount) |
| Computer Hardware | | |
| Computer Networks | Insurance and Casualty | Retail (Drugs) |
| Computer Peripherals | Internet | Retail (Grocery) |
| Computer Services | Investment Services | Retail (Home Improvement) |
| Computer Software | Iron & Steel | |
| Computer Storage Devices | ISP | Retail (Mail Order) |
| Constr. & Agric. Machinery | Jewelry & Silverware | Retail (Specialty Non-Apparel) |
| | Media & Entertainment | |
| Constr. - Supplies & Fixtures | Medical Equipment & Supplies | Retail (Technology) |
| | | Savings and Loans/Savings Banks |
| Construction - Raw Materials | Metal Mining | |
| | Military | Schools |
| Construction Services | Misc. Capital Goods | Scientific & Technical Instr. |
| Consumer Financial Services | Misc. Fabricated Products | |
| | Misc. Financial Services | Security Systems & Services |
| Containers & Packaging | Misc. Transportation | Semiconductors |
| Crops | Mobile Homes & RVs | Waste Management Services |
| Software & Programming | Tobacco | |
| Telecommunications | Transportation | Water Transportation |
| Textiles - Non Apparel | Trucking | Water Utilities |
| Tires | University | |

Appendix B: Domain Name Server Electronic Interface

This electronic interface enables collection of information and may aid decisions about mail flow control. The electronic interface enables request for senders' IP addresses using Domain Name Server Blacklist (DNSBL)-style queries. The name to be resolved is a special domain appended to the reversed IP octets. For usage tracking purposes, a separate subdomain is used for each software package making use of it. For example, if a sender's address was 192.168.1.2, and an IronPort gateway was doing the lookup, the name to be resolved would be 2.1.168.192.ironport.senderbase.org. Queries will initially have a time to live (TTL) of 300 seconds (5 minutes). This may be reduced or increased.

Lookups can also be done based on domain name or organization name. These queries must include another subdomain prepended to the regular IP-based subdomain. For domains, the subdomain "domain" is used. For organizations, "org" is used. For example:

yahoo.com.domain.ironport.senderbase.org

Yahoo! Inc..org.ironport.senderbase.org

Note that there is a space appended to the organization name. This may be useful if two consecutive periods are not allowed by many resolvers.

The result of the query will be a string such as:

0-0=1|1=Yahoo! Inc.|4=25991|246=16

Each string may begin with the record number. If the result ends up being larger than 255 characters, there may be multiple records returned. Since there may be no guarantee that they'll be returned in the correct order, the records may be sorted by the client based on the record number. After the record number and hyphen, there is a string of key=value fields separated by pipes. Pipes within values are discarded. Keys are always numerical indexes. In one embodiment, key 1 is the organization name, key 4 is the organization ID, and key 46 is the subnet's CIDR range.

There is no limit to the length of a single field value, however it's preferable for the entire response to fit in one 512-byte UDP packet. Fields that are too long for a single record are continued on the next record. Multiple records may simply be concatenated (minus record number and hyphen) after being sorted based on their record numbers.

The following table presents a list of available fields for address-based lookups:

| ID | Response Name | Example value | Tables/columns used | Comments |
|---|---|---|---|---|
| 0 | Version number | 1 | None | |
| 1 | Organization name | BigSender, Inc | senders.organization | |
| 2 | Organization daily magnitude | 7.98 | stats.emails_day, senders.organization, senders_org.lastday | |

-continued

| ID | Response Name | Example value | Tables/columns used | Comments |
|---|---|---|---|---|
| 3 | Organization monthly magnitude | 5.98 | stats.emails (month), senders.organization, senders_org.lastmonth | |
| 4 | Organization ID | 123489 | senders.organization, org_map.orgid | |
| 5 | Category | Email Marketing | senders.category | |
| 6 | Timestamp of first message from this organization | 1053561676 | senders.organization, senders_org.ctime | |
| 7 | # of domains in this organization | 14 | senders.organization, senders_org.num_domains | |
| 8 | # of IP's controlled by this organization | 256 | senders.organization, senders_org.all_ips | |
| 9 | # of IP's in organization being used to send email | 241 | senders.organization, senders_org.active_ips | |
| 10 | Fortune 1000 status | Y | senders.organization, senders_org.f1000status | |
| 20 | Hostname | spamcannon1. | senders.hostname | |
| 21 | Domain | bigfatspammer.com | senders.domain | |
| 22 | A record matches PTR record | N | senders.dnsmatch | |
| 23 | Domain daily magnitude | 6.51 | stats.emails_day, senders.domain, senders_dom.lastday | |
| 24 | Domain monthly magnitude | 7.25 | stats.emails, senders.domain, senders_dom.lastmonth | |
| 25 | Timestamp of first message from this domain | 1053561676 | senders.domain, senders_dom.ctime | |
| 26 | SenderBase domain rating | AAA | senders.domain, senders_dom.rating | |
| 40 | IP address daily magnitude | 4.51 | stats.emails_day, senders.lastday | |
| 41 | IP address monthly magnitude | 4.91 | stats.emails, senders.lastmonth | |
| 42 | Highest previous magnitude | 5.19 | Not implemented | |
| 43 | Average magnitude | 4.81 | senders.ctime, senders.forever | |
| 44 | 30 day IP volume/ lifetime IP volume | 20% | senders.lastmonth, senders.forever | |
| 45 | Bonded Sender status | N | None | |
| 46 | CIDR range | 24 | senders.netbits | |
| 47 | % blacklists | 50% | Not implemented | |
| 48 | Subdivision mask | 24 | senders.netbits (min 24) | |
| 49 | Flow control coefficient | .75 | senders.organization, org_map.fcc | |
| 50 | City | Sunnyvale | senders.location, locations.city | |
| 51 | State/province | CA | senders.location, locations.city | |
| 52 | Postal code | 94089 | senders.location, locations.zip | |
| 53 | Country | US | senders.location, locations.country | |
| 54 | Longitude | −121.705 | senders.location, locations.longitude | |
| 55 | Latitude | 37.1894 | senders.location, locations.latitude | |

The following table presents a list of available fields for domain-based lookups:

| ID | Response Name | Example value | Tables/columns used | Comments |
|----|---------------|---------------|---------------------|----------|
| 0 | Version number | 1 | None | |
| 5 | Category | Email Marketing | senders_dom.category | |
| 23 | Domain daily magnitude | 6.51 | stats.emails_day, senders_dom.lastday | |
| 24 | Domain monthly magnitude | 7.25 | stats.emails, senders_dom.lastmonth | |
| 25 | Timestamp of first message from this domain | 1053561676 | senders_dom.ctime | |
| 26 | SenderBase domain rating | AAA | senders_dom.rating | |

The following table presents a list of available fields for organization-based lookups:

| ID | Response Name | Example value | Tables/columns used | Comments |
|----|---------------|---------------|---------------------|----------|
| 0 | Version number | 1 | None | |
| 2 | Organization daily magnitude | 7.98 | stats.emails_day, senders_org.lastday | |
| 3 | Organization monthly magnitude | 5.98 | stats.emails, senders_org.lastmonth | |
| 4 | Organization ID | 123489 | org_map.orgid | |
| 5 | Category | Email Marketing | senders_org.category | |
| 6 | Timestamp of first message from this organization | 1053561676 | senders_org.ctime | |
| 7 | # of domains in this organization | 14 | senders_org.num_domains | |
| 8 | # of IP's controlled by this organization | 256 | senders_org.all_ips | |
| 9 | # of IP's in organization being used to send email | 241 | senders_org.active_ips | |
| 10 | Fortune 1000 status | Y | senders_org.f1000status | |
| 47 | % blacklists | 50% | Not implemented | |
| 49 | Flow control coefficient | .75 | org_map.fcc | |

A query may include a bitmask that specifies which fields are returned. The bitmask may be included in a higher-level subdomain in hex format. For example:

$ host—t txt 218.66.218.66.ff.ironport.senderbase.org 218.66.218.66.ff.ironport.senderbase.org descriptive text "0-0=1|1=Yahoo! Inc.|2=8.57|3=8.38|4=25991|5=ISP|6=1049230071|7=5"

$ host—t txt 218.66.218.66.2f.ironport.senderbase.org 218.66.218.66.2f.ironport.senderbase.org descriptive text "0-0=1|1=Yahoo! Inc|2=8.57|3=8.38|4=25991|5=ISP"

$ host—t txt 218.66.218.66.0f.ironport.senderbase.org 218.66.218.66.0f.ironport.senderbase.org descriptive text "0-0=1|1=Yahoo! Inc.|2=8.57|3=8.38"

$ host—t txt yahoo.com.domain.ironport.senderbase.org yahoo.com.domain.ironport.senderbase.org descriptive text "0-0=1|5=ISP|23=8.57|24=8.40|25=1049250899|26=NR"

$ host—t txt yahoo.com.domain.ff.ironport.senderbase.org yahoo.com.domain.ff.ironport.senderbase.org descriptive text "0-0=1|5=ISP"

$ host—t txt 'Yahoo! Inc..org.ff.ironport.senderbase.org'

Yahoo!\032Inc.\032.org.ff.ironport.senderbase.org descriptive text "0-0=1|2=8.57|3=8.43|5=ISP|6=1049230071|7=33"

$ host—t txt 'Yahoo!Inc. .org. ironport.senderbase.org'

Yahoo!\032Inc.\032.org.ironport.senderbase.org descriptive text "0-0=1|2=8.57|3=8.43|5=ISP|6=1049230071|7=33|8=43812|9=5311"

Appendix C: Example Database Table Descriptions

Per-IP data, one row per IP address that has sent email:
mysql>describe senders;

| Field | Type | Null | Key | Default | Extra |
|-------|------|------|-----|---------|-------|
| ip | int (11) | | PRI | 0 | |
| lastday | int (10) unsigned | | MUL | 0 | |
| lastmonth | int (10) unsigned | | MUL | 0 | |
| highestmonth | int (10) unsigned | | | 0 | |
| forever | int (10) unsigned | | | 0 | |
| netbits | tinyint (4) | YES | | NULL | |
| organization | varchar (128) | YES | MUL | NULL | |
| category | varchar (64) | YES | MUL | NULL | |
| hostname | varchar (128) | YES | MUL | NULL | |
| domain | varchar (64) | YES | MUL | NULL | |
| dnsmatch | tinyint (4) | YES | | NULL | |
| dnslists | bigint (20) | YES | | NULL | |
| location | int (10) unsigned | | | 0 | |
| mtime | timestamp (14) | YES | | NULL | |
| ctime | timestamp (14) | YES | | NULL | |

The IP address is an integer. The dotted-quad address may be converted into a proper integer using:
/usr/ironport/bin/convertip.py 127.0.0.1
213076433
/usr/ironport/bin/convertip.py 0.0.0.1
1

Note: the algorithm for convertip.py is: first*256^3+second*256^2+third*256+fourth (for each part of the dotted-quad address).

Per-organization data, one row per organization that has sent email:
mysql>describe senders_org;

| Field | Type | Null | Key | Default | Extra |
|---|---|---|---|---|---|
| organization | varchar (128) | | PRI | | |
| lastday | int (10) unsigned | | MUL | 0 | |
| lastmonth | int (10) unsigned | | MUL | 0 | |
| forever | int (10) unsigned | | | 0 | |
| active_ips | int (10) unsigned | | | 0 | |
| all_ips | int (10) unsigned | | | 0 | |
| category | varchar (64) | YES | MUL | NULL | |
| f1000status | tinyint (4) | YES | | NULL | |
| contact | text | YES | | NULL | |
| description | text | YES | | NULL | |
| mtime | timestamp (14) | YES | | NULL | |
| ctime | timestamp (14) | YES | | NULL | |

Per-organization data, one row for every known organization:
mysql>describe org_map;

| Field | Type | Null | Key | Default | Extra |
|---|---|---|---|---|---|
| whoisorg | varchar (128) | | PRI | | |
| organization | varchar (128) | YES | MUL | NULL | |
| orgid | int (10) unsigned | | MUL | 0 | |
| mtime | timestamp (14) | YES | | NULL | |
| fcc | float | YES | | NULL | |

Example row in each table:
mysql>select ip,netbits,organization,category,hostname,domain from senders;

| ip | netbits | organization | category | hostname | domain |
|---|---|---|---|---|---|
| 1 | 24 | Filthy Spammers | Spammer | foo.example.com | example.com | mysql>select organization,category from senders_org;

| organization | category |
|---|---|
| Filthy Spammers | Spammer | mysql>insert into org_map (whoisorg,orgid,fcc) values ("Filthy Spammers",31337,0.5);
Query OK, 1 row affected (0.39 sec)
mysql>select*from org_map where whoisorg="Filthy Spammers";

| whoisorg | organization | orgid | mtime | fcc |
|---|---|---|---|---|
| Filthy Spammers | NULL | 31337 | 20030701194443 | 0.5 |

The DNS interface may be controlled using
/usr/local/etc/rc.d/sb-dns.sh
{start|stop|restart}.
Behavior of the DNS interface may be controlled by editing
/usr/senderbase/dns/conf.py. For example:
listen_port=53
listen_addr='172.17.0.129'
zones=[ironport\.senderbase\.org']
debug='/var/log/sbdns'
db={'user':'root', 'password':'78sF$q9nvkjjsdk', 'ip': '127.0.0.1', 'port':3306}
dns_ttl=300
db_cache_ttl=0
artificial_sleep=0.0

The artificial_sleep variable may cause the server to pause for that number of seconds before answering a request. One may want to set this to a very high number to test lookup timeouts. If one stops the server, the C60 will get an Internet Control Message Protocol (ICMP) port unreachable and will fail quickly. A very high response time would be closer to the behavior of a network outage.

One may test that the DNS server is properly serving data by running
host—t txt 1.0.0.0. ironport.senderbase.org qa29.qa
Using domain server:
Name: qa29.qa
Addresses: 162.17.0.129
1.0.0.0.ironport.senderbase.org descriptive text "0-0=1|1=Filthy Spammers|4=31337|5=Spammer|6=0|7=0|10=N|20=foo.|21=example.com |25=0|45=N|46=24|48=24|49=0.5"

Appendix D, submitted as an ASCII text file named AppendixD.txt, provides a sequel query language (SQL) creation script for an example database schema for collecting, aggregating, and managing information relating to electronic messages.

What is claimed is:

1. A method for managing information relating to electronic messages, comprising the steps of:
receiving, from a plurality of message information collectors, message information that describes characteristics of a set of electronic messages received by the plurality of message information collectors,
wherein the message information is separate and distinct from the set of electronic messages which it describes;
processing, at a data processing unit, the message information to generate message volume information, wherein the message volume information describes characteristics of a set of message senders of electronic messages over a period of time, wherein each of the set of message senders sent one or more of the set of electronic messages identified in the message information, and
wherein the message volume information includes a prediction metric that indicates a likelihood that a particular message sender, of the set of message senders, has been sending unsolicited commercial electronic messages; and
providing, to an email gateway, the prediction metric and at least one other characteristic of the particular message sender described in the message volume information, wherein at least the prediction metric and the at least one other characteristic are used by the email gateway in determining whether to treat a particular electronic message, sent by the particular message sender, received by the email gateway, as an unsolicited commercial electronic message, wherein said particular message sender is a second email gateway;

wherein the email gateway is separate from the data processing unit;

wherein the step of processing, at the data processing unit, the message information to generate the message volume information comprises the step of:

determining how many requests for information about the particular message sender were received during a particular period of time;

wherein the method is performed by one or more computing devices.

2. The method of claim 1, wherein the plurality of message information collectors include one or more of an email gateway, an information request handler, and an email client.

3. The method of claim 1, wherein the step of processing, at the data processing unit, the message information to generate the message volume information comprises the step of:
determining when a message was sent by the particular message sender.

4. The method of claim 1, wherein:
the particular message sender is associated with a particular Internet Protocol (IP) address, and
the step of processing, at the data processing unit, the message information to generate the message volume information comprises the steps of:
determining second message volume information for the particular message sender based on the particular IP address, and
determining a network topology for the particular message sender based on the particular IP address.

5. The method of claim 4, wherein:
the step of determining the network topology for the particular message sender comprises determining other IP addresses that share high-order significant bits with the particular IP address, and
the step of determining the second message volume information comprises determining third message volume information related to a second set of message senders associated with the other IP addresses.

6. The method of claim 1, wherein:
the step of processing, at the data processing unit, the message information to generate the message volume information comprises the step of determining a category associated with a particular message sender of the set of message senders, and
the generation of the prediction metric is performed, at least in part, using the category.

7. The method of claim 1, wherein:
the step of processing, at the data processing unit, the message information to generate the message volume information comprises determining second message volume information related to the particular message sender,
the particular message sender is associated with a network owner,
the network owner is associated with a category,
the step of determining the second message volume information comprises determining a second category for the particular message sender based on the category associated with the network owner, and
wherein the second message volume information reflects the second category.

8. The method of claim 7, further comprising the step of:
at the email gateway, modifying the delivery of any messages sent from message senders, of the set of message senders that are associated with the second category.

9. The method of claim 1, wherein the step of processing, at the data processing unit, the message information to generate the message volume information comprises the step of:
determining a geographical location of the particular message sender.

10. The method of claim 9, wherein the step of determining the geographical location of the particular message sender is performed based on an IP address associated with the particular message sender.

11. The method of claim 1, wherein the step of processing, at the data processing unit, the message information to generate the message volume information comprises the step of:
determining a set of geographical locations for a set of gateways through which the particular electronic message, sent by the particular message sender, has traveled.

12. The method of claim 1, wherein the step of processing, at the data processing unit, the message information to generate the message volume information comprises the step of:
determining whether a particular condition is satisfied by the message volume information.

13. The method of claim 12, further comprising the steps of:
receiving a request, from a user, to subscribe to a user alert, wherein said user alert is associated with the particular condition; and
if the message volume information indicates that the particular condition is satisfied, then sending a communication to the user indicating that the particular condition has been satisfied.

14. The method of claim 1, wherein generation of the prediction metric is performed, at least in part, using information regarding a change in ownership of an IP address associated with the particular message sender.

15. The method of claim 1, further comprising the steps of:
receiving a request for information about the message volume information; and
displaying a graphical user interface that comprises one or more panels, wherein each of the one or more panels displays, at least a portion of, the message volume information.

16. The method of claim 1, further comprising the steps of:
receiving a request for information about the message volume information; and
providing the message volume information through an electronic interface.

17. The method of claim 1, further comprising the step of:
estimating a volume of messages sent by the particular message sender during the period of time based on how many requests for information, about the particular message sender during the period of time, were received.

18. The method of claim 1, wherein the prediction metric comprises one value in a sequence of values, and wherein the position of each value in the sequence of values indicates a relative likelihood that messages sent by the particular sender are unsolicited commercial electronic messages.

19. The method of claim 1, wherein:
the method further comprises the step of receiving, from a second plurality of message information collectors, second message information related to, at least a portion of, the set of message senders, and the generation of the message volume information is based, at least in part, on the second message information.

20. The method of claim 19, wherein the plurality of message information collectors and the second plurality of message information collectors are the same plurality of message information collectors; and wherein the step of receiving the message information and the step of receiving the second message information are performed at different points in time.

21. The method of claim 1, wherein the step of processing, at the data processing unit, the message information to generate the message volume information comprises:

determining a first volume of messages sent by the particular message sender during a first time period;

determining a second volume of messages sent by the particular message sender during a second time period; and determining a change in volume between the first volume of messages and the second volume of messages.

22. The method of claim 21, wherein the step of determining the first volume of messages comprises determining a first relative magnitude of volume of messages sent by the particular message sender in relation to other message senders, of the set of message senders, during the first time period, the step of determining the second volume of messages further comprises determining a second relative magnitude of volume of messages sent by the particular message sender in relation to the other message senders, of the set of message senders, during the second time period, and the generation of the prediction metric is based, at least in part, on the first relative magnitude of volume of messages and the second relative magnitude of volume of messages.

23. The method of claim 1, wherein the step of processing, at the data processing unit, the message information to generate the message volume information comprises:

determining a percentage of messages sent by the particular message sender relative to the messages sent by a set of other message senders.

24. The method of claim 1, wherein the step of processing, at the data processing unit, the message information to generate the message volume information comprises:

determining a logarithm of the percentage of messages sent by the particular message sender relative to the messages sent by other message senders.

25. A method of managing information relating to electronic messages, comprising the steps of:

receiving at an email gateway, from a particular message sender, one or more electronic messages;

sending, to a data processing unit that is separate from said email gateway, a request for message volume information related to the particular message sender;

receiving the message volume information related to the particular message sender, wherein the message volume information describes a set of characteristics of the particular message sender over a period of time, wherein the message volume information is generated based on message information received from a plurality of message information collectors, wherein the message volume information includes a prediction metric that indicates a likelihood that the particular sender has been sending unsolicited commercial electronic messages, and wherein the message volume information includes a value based at least in part on the number of requests for information about the particular message sender that were received during a particular period of time;

determining how to modify the delivery of a plurality of messages to one or more recipients, from the particular message sender based, at least in part, on the prediction metric and at least one other characteristic of the particular message sender described in the message volume information; and modifying the delivery of a plurality of messages to one or more recipients from the particular message sender based on the prediction metric in the message volume information;

wherein said particular message sender is a second email gateway;

wherein the method is performed by one or more computing devices.

26. The method of claim 25, wherein the step of modifying the delivery of a plurality of messages comprises (a) automatically associating the plurality of messages with a particular folder of an email client, (b) deleting the particular message, (c) indicating that the plurality of messages are bulk mail, (d) indicating that the plurality of messages are unsolicited, or (e) throttling the messages.

27. The method of claim 25, further comprising the steps of:

receiving a second plurality of messages from a second message sender;

determining that the particular message sender is related to the second message sender; and modifying the delivery of the second plurality of messages from the second message sender based on the message volume information related to the particular message sender.

28. A machine-readable volatile or non-volatile medium storing one or more sequences of instructions for managing information relating to electronic messages, wherein execution of the one or more sequences of instructions by one or more processors causes the one or more processors to perform the steps of:

receiving, from a plurality of message information collectors, message information that describes characteristics of a set of electronic messages received by the plurality of message information collectors;

wherein the message information is separate and distinct from the set of electronic messages which it describes;

processing, at a data processing unit, the message information to generate message volume information, wherein the message volume information describes characteristics of a set of message senders of electronic messages over a period of time, wherein each of the set of message senders sent one or more of the set of electronic messages identified in the message information, and wherein the message volume information includes a prediction metric that indicates a likelihood that a particular message sender, of the set of message senders, has been sending unsolicited commercial electronic messages; and providing, to an email gateway, the prediction metric and at least one other characteristic of the particular message sender described in the message volume information, wherein at least the prediction metric and the at least one other characteristic are used by the email gateway in determining whether to treat a particular electronic message, sent by the particular sender, received by the email gateway, as an unsolicited commercial electronic message, wherein said particular message sender is a second email gateway;

wherein the email gateway is separate from the data processing unit;

wherein the processing, at the data processing unit, the message information to generate the message volume information comprises:

determining how many requests for information about the particular message sender were received during a particular period of time.

29. The machine-readable medium of claim 28, wherein the plurality of message information collectors include at least one of an email gateway, an information request handler, and an email client.

30. The machine-readable medium of claim 28, wherein the step of processing, at the data processing unit, the message information to generate the message volume information comprises the step of:

determining when a message was sent by the particular message sender.

31. The machine-readable medium of claim 28, wherein:

the particular message sender is associated with a particular Internet Protocol (IP) address, and the step of processing, at the data processing unit, the message information to generate the message volume information comprises the steps of:

determining second message volume information for the particular message sender based on the particular IP address, and determining a network topology for the particular message sender based on the particular IP address.

32. The machine-readable medium of claim 31, wherein:

the step of determining the network topology for the particular message sender comprises determining other IP addresses that share high-order significant bits with the particular IP address, and the step of determining the second message volume information comprises determining third message volume information related to a second set of message senders associated with the other IP addresses.

33. The machine-readable medium of claim 28, wherein:

the step of processing, at the data processing unit, the message information to generate the message volume information comprises the step of determining a category associated with a particular message sender of the set of message senders, and the generation of the prediction metric is performed, at least in part, using the category.

34. The machine-readable medium of claim 28, wherein:

the step of processing, at the data processing unit, the message information to generate the message volume information comprises determining second message volume information related to the particular message sender, the particular message sender is associated with a network owner, the network owner is associated with a category, the step of determining the second message volume information comprises determining a second category for the particular message sender based on the category associated with the network owner, and wherein the second message volume information reflects the second category.

35. The machine-readable medium of claim 34, wherein execution of the one or more sequences of instructions by the one or more processors causes the one or more processors to perform the step of:

at the email gateway, modifying the delivery of any messages sent from message senders, of the set of message senders that are associated with the second category.

36. The machine-readable medium of claim 28, wherein the step of determining the processing, at the data processing unit, the message information to generate volume information comprises the step of:

determining a geographical location of the particular message sender.

37. The machine-readable medium of claim 36, wherein the step of determining the geographical location of the particular message sender is performed based on an IP address associated with the particular message sender.

38. The machine-readable medium of claim 28, wherein the step of processing, at the data processing unit, the message information to generate the message volume information comprises the step of:

determining a set of geographical locations for a set of gateways through which the particular electronic message, sent by from the particular sender, has traveled.

39. The machine-readable medium of claim 28, wherein the step of processing, at the data processing unit, the message information to generate the message volume information comprises the step of:

determining whether a particular condition is satisfied by the message volume information.

40. The machine-readable medium of claim 39, wherein execution of the one or more sequences of instructions by the one or more processors causes the one or more processors to perform the steps of:

receiving a request, from a user, to subscribe to a user alert, wherein said user alert is associated with the particular condition; and if the message volume information indicates that the particular condition is satisfied, then sending a communication to the user indicating that the particular condition has been satisfied.

41. The machine-readable medium of claim 28, wherein the generation of the prediction metric is performed, at least in part, using information regarding a change in ownership of an IP address associated with the particular message sender.

42. The machine-readable medium of claim 28, wherein execution of the one or more sequences of instructions by the one or more processors causes the one or more processors to perform the steps of:

receiving a request for information about the message volume information; and displaying a graphical user interface that comprises one or more panels, wherein each of the one or more panels displays, at least a portion of, the message volume information.

43. The machine-readable medium of claim 28, wherein execution of the one or more sequences of instructions by the one or more processors causes the one or more processors to perform the steps of:

receiving a request for information about the message volume information; and providing the message volume information through an electronic interface.

44. The machine-readable medium of claim 28, wherein execution of the one or more sequences of instructions by the one or more processors causes the one or more processors to perform the step of:

estimating a volume of messages sent by the particular message sender during the period of time based on how many requests for information, about the particular message sender during the period of time, were received.

45. The machine-readable medium of claim 28, wherein the prediction metric comprises one value in a sequence of values, and wherein the position of each value in the sequence of values indicates a relative likelihood that messages sent by the particular sender are unsolicited commercial electronic messages.

46. The machine-readable medium of claim 28, wherein:
the method further comprises the step of receiving, from a second plurality of message information collectors, second message information related to, at least a portion of, the set of message senders, and
the generation of the message volume information is based, at least in part, on the second message information.

47. The machine-readable medium of claim 46, wherein the plurality of message information collectors and the second plurality of message information collectors are the same plurality of message information collectors; and wherein the step of receiving the message information and the step of receiving the second message information are performed at different points in time.

48. The machine-readable medium of claim 28, wherein the step of processing, at the data processing unit, the message information to generate the message volume information comprises:
determining a first volume of messages sent by the particular message sender during a first time period;
determining a second volume of messages sent by the particular message sender during a second time period; and
determining a change in volume between the first volume of messages and the second volume of messages.

49. The machine-readable medium of claim 48, wherein
the step of determining the first volume of messages comprises determining a first relative magnitude of volume of messages sent by the particular message sender in relation to other message senders, of the set of message senders, during the first time period,
the step of determining the second volume of messages further comprises determining a second relative magnitude of volume of messages sent by the particular message sender in relation to the other message senders, of the set of message senders, during the second time period, and
the generation of the prediction metric is based, at least in part, on the first relative magnitude of volume of messages and the second relative magnitude of volume of messages.

50. The machine-readable medium of claim 28, wherein the step of processing, at the data processing unit, the message information to generate the message volume information comprises:
determining a percentage of messages sent by the particular message sender relative to the messages sent by a set of other message senders.

51. The machine-readable medium of claim 28, wherein the step of processing, at the data processing unit, the message information to generate the message volume information comprises:
determining a logarithm of the percentage of messages sent by the particular message sender relative to the messages sent by other message senders.

52. A machine-readable volatile or non-volatile medium storing one or more sequences of instructions for managing information relating to electronic messages, wherein execution of the one or more sequences of instructions by one or more processors causes the one or more processors to perform the steps of:
receiving at an email gateway, from a particular message sender, one or more electronic messages;
sending, to a data processing unit that is separate from said email gateway, a request for message volume information related to the particular message sender;
receiving the message volume information related to the particular message sender, wherein the message volume information describes a set of characteristics of the particular message sender over a period of time,
wherein the message volume information is generated based on message information received from a plurality of message information collectors,
wherein the message volume information includes a prediction metric that indicates a likelihood that the particular sender has been sending unsolicited commercial electronic messages, and
wherein the message volume information includes a value based at least in part on the number of requests for information about the particular message sender were received during a particular period of time;
determining how to modify the delivery of a plurality of messages to one or more recipients, from the particular sender based, at least in part, on the prediction metric and at least one other characteristic of the particular message sender described in the message volume information; and
modifying the delivery of a plurality of messages to one or more recipients from the particular message sender based on the prediction metric in the message volume information;
wherein said particular message sender is a second email gateway.

53. The machine-readable medium of claim 52, wherein the step of modifying the delivery of a plurality of messages comprises (a) automatically associating the plurality of messages with a particular folder of an email client, (b) deleting the plurality of messages, (c) indicating that the plurality of messages are bulk mail, (d) indicating that the plurality of messages are unsolicited, or (e) throttling the messages.

54. The machine-readable medium of claim 52, wherein execution of the one or more sequences of instructions by the one or more processors causes the one or more processors to further perform the steps of:
receiving a second plurality of messages from a second message sender;
determining that the particular message sender is related to the second message sender; and
modifying the delivery of the second plurality of messages from the second message sender based on the message volume information related to the particular message sender.

55. A system for managing information relating to electronic messages, comprising:
a plurality of message information collectors, wherein each of the plurality of message information collectors is configured to transmit message information to a data processing unit,
wherein the message information that is sent by a particular message information collector, of the plurality of message information collectors, to the data processing unit describes characteristics of a set of electronic messages received by the particular message information collector, wherein the message information is separate and distinct from the set of electronic messages which it describes; and the data processing unit, wherein the data processing unit is configured to perform the steps of:

processing the message information received by the data processing unit to generate message volume information, wherein the message volume information describes characteristics of a set of message senders of electronic messages over a period of time, wherein each of the set of message senders sent one or more of the set of electronic messages identified in the message information, and wherein the message volume information includes a prediction metric that indicates a likelihood that a particular message sender, of the set of message senders, has been sending unsolicited commercial electronic messages; and providing, to an email gateway, the prediction metric and at least one other characteristic of the particular message sender described in the message volume information, wherein at least the prediction metric and the at least one other characteristic are used by the email gateway in determining whether to treat a plurality of electronic messages, sent by the particular message sender, received by the email gateway, as unsolicited commercial electronic messages, wherein said particular message sender is a second email gateway;

wherein the email gateway is separate from the data processing unit;

wherein the processing the message information received by the data processing unit to generate the message volume information comprises:

determining how many requests for information about the particular message sender were received during a particular period of time.

56. The method of claim 25, wherein the step of modifying the delivery of a plurality of message comprises at least one of (a) labeling messages from the particular message sender as spam, (b) throttling messages from the particular message sender based on the message volume information, or (c) blocking messages from the particular message sender from being delivered.

57. The machine-readable medium of claim 52, wherein the step of modifying the delivery of a plurality of messages comprises at least one of (a) labeling messages from the particular message sender as spam, (b) throttling messages from the particular message sender based on the message volume information, or (c) blocking messages from the particular message sender from being delivered.

* * * * *

UNITED STATES PATENT AND TRADEMARK OFFICE
CERTIFICATE OF CORRECTION

PATENT NO.        : 7,653,695 B2                                            Page 1 of 1
APPLICATION NO.   : 11/062320
DATED             : January 26, 2010
INVENTOR(S)       : Andrew Flury It is certified that error appears in the above-identified patent and that said Letters Patent is hereby corrected as shown below:

On the Title Page
Item -56- References Cited
Other Publications
Please insert:
--Patent Cooperation Treaty, "Notification Concerning Transmittal of Copy of International Preliminary Report on Patentability," PCT/US2005/005498, received September 12, 2006, 7 pages.

Current Claims, PCT/US2005/005498, 14 pages.--

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,695 B2 | Page 1 of 1 |
| APPLICATION NO. | : 11/062320 | |
| DATED | : January 26, 2010 | |
| INVENTOR(S) | : Flury et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Twenty-eighth Day of December, 2010

David J. Kappos
*Director of the United States Patent and Trademark Office*